United States Patent
Mandava et al.

(10) Patent No.: US 7,210,066 B2
(45) Date of Patent: Apr. 24, 2007

(54) METHOD AND SYSTEM FOR DETERMINING COMPUTER SOFTWARE TEST COVERAGE

(75) Inventors: Ramesh Babu Mandava, San Jose, CA (US); Jean-Francois Arcand, Prevost (CA)

(73) Assignee: Sun Microsystems, Inc., Santa Clara, CA (US)

( * ) Notice: Subject to any disclaimer, the term of this patent is extended or adjusted under 35 U.S.C. 154(b) by 636 days.

(21) Appl. No.: 10/334,415

(22) Filed: Dec. 31, 2002

(65) Prior Publication Data

US 2004/0128584 A1 Jul. 1, 2004

(51) Int. Cl.
G06F 11/00 (2006.01)
(52) U.S. Cl. ......................................... 714/38; 717/124
(58) Field of Classification Search ................ 714/703, 714/37
See application file for complete search history.

(56) References Cited

U.S. PATENT DOCUMENTS

| | | | | |
|---|---|---|---|---|
| 6,002,869 A | * | 12/1999 | Hinckley | 717/124 |
| 6,542,845 B1 | * | 4/2003 | Grucci et al. | 702/122 |
| 6,601,020 B1 | * | 7/2003 | Myers | 702/186 |
| 6,697,967 B1 | * | 2/2004 | Robertson | 714/43 |
| 6,725,399 B1 | * | 4/2004 | Bowman | 714/38 |
| 6,735,719 B2 | * | 5/2004 | Moe et al. | 714/38 |
| 6,826,716 B2 | * | 11/2004 | Mason | 714/38 |
| 6,859,922 B1 | * | 2/2005 | Baker et al. | 717/125 |
| 6,892,328 B2 | * | 5/2005 | Klein et al. | 714/42 |
| 6,898,784 B1 | * | 5/2005 | Kossatchev et al. | 717/126 |
| 6,996,517 B1 | * | 2/2006 | Papaefstathiou | 703/22 |
| 2003/0003432 A1 | * | 1/2003 | Kinzhalin et al. | 434/322 |
| 2003/0159132 A1 | * | 8/2003 | Barnett et al. | 717/124 |
| 2003/0196191 A1 | * | 10/2003 | Hartman et al. | 717/126 |
| 2004/0015870 A1 | * | 1/2004 | Arbouzov et al. | 717/126 |
| 2004/0205563 A1 | * | 10/2004 | Lee | 715/513 |
| 2005/0102652 A1 | * | 5/2005 | Sulm et al. | 717/115 |
| 2005/0160395 A1 | * | 7/2005 | Hughes | 717/102 |
| 2005/0203924 A1 | * | 9/2005 | Rosenberg | 707/100 |

OTHER PUBLICATIONS

Hwei Yin, James M. Bieman, Improving Software Testability with Assertion Insertion, 1994, pp. 831-839.*
Raimondas Lencevicius, Edu Metz, Alexander Ran, Tracing Execution of Software for Design Coverage, 2001, pp. 328-332.*
Ernesto Guerrieri, Software Document Reuse with XML.*

\* cited by examiner

*Primary Examiner*—Scott Baderman
*Assistant Examiner*—Loan Truong
(74) *Attorney, Agent, or Firm*—Martine Penilla & Gencarella, LLP

(57) ABSTRACT

A method for analyzing a test coverage of a software application specification by a test suite is provided. The method includes reading an assertion document for a specification. The assertion document has a corresponding tagged assertion for each assertion in the specification. Each tagged assertion is defined in a markup language. The method also includes reading a static file for defining tests of the test suite. The static file is defined in the markup language. The test suite is divided into tests and each test is divided into test cases. The static file is configured to include an entry for each test case and each entry is configured to include tagged assertions tested by the test case. Also included in the method is correlating each of the tagged assertions in the assertion document with the test cases in the static file so as to determine test coverage of the specification.

19 Claims, 18 Drawing Sheets

```xml
<assertion>
    <id>JavaServerPages: 1.2_PDF1:2:2.1:1</id>
    <name>/JSP/protocol/HTTP</name>
    <description>HTTP is the default protocol for
            requests and responses.</description>
    <subassertions>
            <subassertion>
                    <id>JavaServerPages: 1.2_PDF1:2:2.1:1#1</id>
                    <name>JSP/requests/JSP/protocol/HTTP</name>
                    <description>HTTP is the default protocol
                            for requests.</description>
            </subassertion>
    </subassertions>
</assertion>
<assertion>
    <id>JavaServerPages: 1.2_PDF1:2:2.1:2</id>
    <name>JSP/protocol/HTTPS</name>
    <description>HTTP is the secure protocol for requests
            and responses that JSP also supports.</description>
    <depends>
        <depend>JavaServerPages: 1.2_PDF1:2:1.1:3</depend>
    </depends>
</assertion>
```

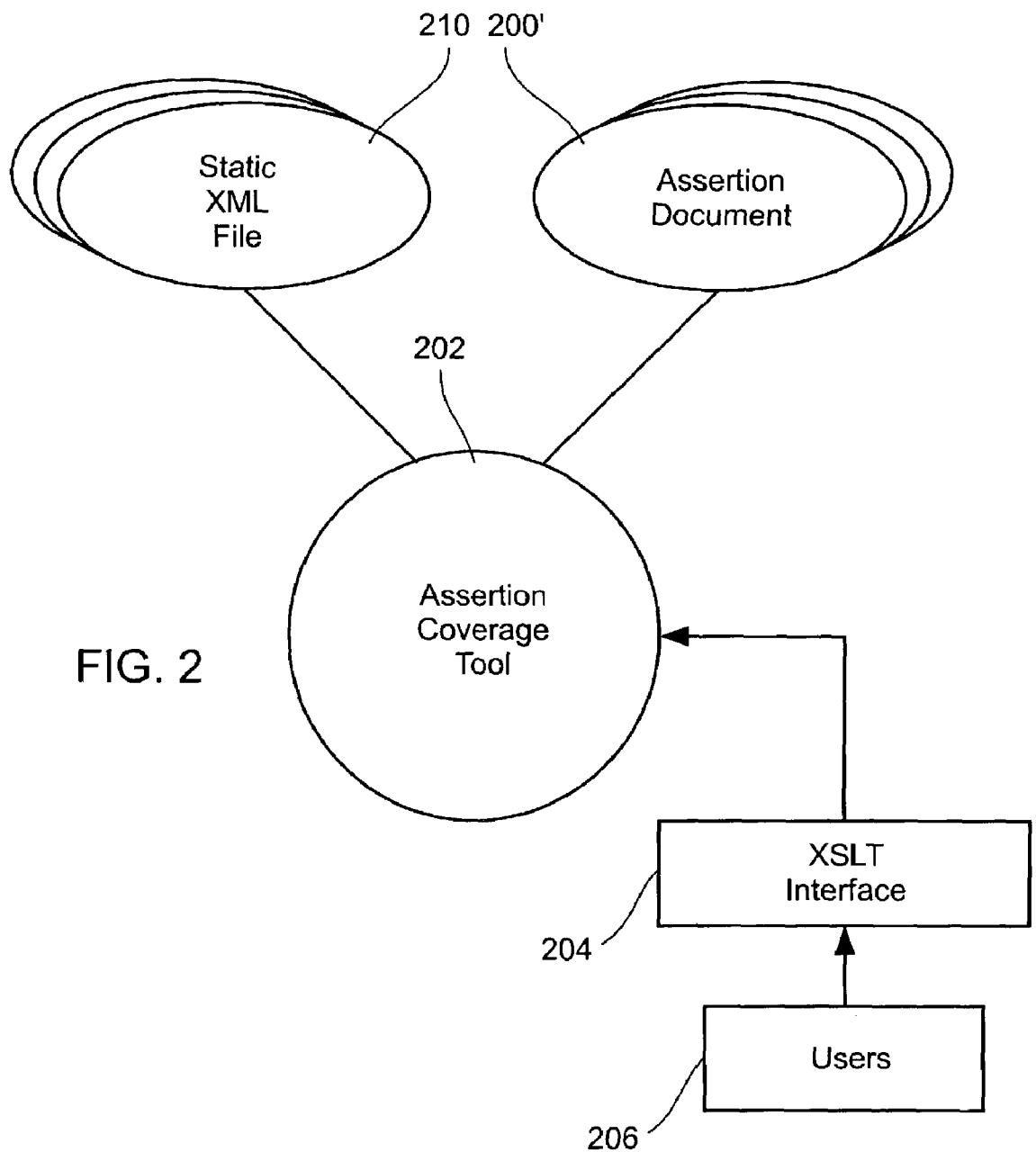

| Assertions Tested by Test Suite 1 | Assertions Tested by Test Suite 2 | Assertions not Tested by Test Suite 1 | Assertions not Tested by Test Suite 2 | Assertions not Tested at all | Assertions Tested by Test Suite 1 & 2 |
|---|---|---|---|---|---|
| A1 | A1 | A2 | A4 | B1 | A1 |
| A3 | A2 | B1 | B1 | B3 | A3 |
| A4 | A3 | B3 | B2 | C1 | A5 |
| A5 | A5 | B8 | B3 | C3 | B5 |
| B2 | B5 | C1 | B4 | | B6 |
| B4 | B6 | C3 | B7 | | C2 |
| B5 | B8 | | B8 | | |
| B6 | C2 | | C1 | | |
| B7 | | | C3 | | |
| C2 | | | | | |

FIG. 3G

METHOD AND SYSTEM FOR DETERMINING COMPUTER SOFTWARE TEST COVERAGE

BACKGROUND OF THE INVENTION

1. Field of the Invention

The present invention relates generally to software processing, and more particularly, to methods and systems for improving computer software testing using test coverage data.

2. Description of the Related Art

As the use of computer software in performing daily tasks is increasing rapidly, assessing software reliability through software testing has become an imperative stage in the software development cycle. As is well known, software testing is directed toward eliminating defects (i.e., bugs) in computer software, which if undetected, can create significant negative results.

Typically, software testing process involves testing of each specification document by one or multiple test suites. For simplifying the testing operation and ease of reference, test suites are divided into sections, such as tests, with each test being composed of several test cases. For the same reasons, the specification documents are also divided into, among others, chapters, sections, subsections, and assertions. As used herein, assertions are defined as boolean expressions designed to convey a necessary behavior of the software program and are typically included in the text. Assertions may be identified by implementation specific terminology such as "must," "should," "always," "optional," etc.

As the primary goal in testing software application testing is to ensure that the specifications are thoroughly tested, it is crucial to create test suites that when run accumulatively, test the entire specification. Thus far, however, the current state of software testing is incapable of providing a test developer information confirming that a given assertion in the specification document has been tested.

In accordance with the current testing process, the specification document is reviewed by the test group architecture in an attempt to locate all the assertions. Unfortunately, the reviewing process must be performed manually, making this task very tedious and time-consuming. To make the matter worse, merely locating each of the assertions in the specification does not provide the test developer with sufficient information to determine whether a particular assertion has been tested.

Consequently, each assertion must be mapped to the test case designed to test that particular assertion, in an attempt to configure that each and every assertion is tested. Unfortunately, this mapping operation is also very lengthy and tedious as it is performed manually by the test group architecture. Furthermore, despite being time consuming and a waste in resources, the mapping operation provides the test developer very limited information about the test coverage of a specification.

In view of the foregoing, there is a need for a flexible methodology and system for enhancing software testing process by improving test coverage determination of software specifications.

SUMMARY OF THE INVENTION

Broadly speaking, the present invention fills these needs by providing a flexible method and system to enhance software application testing by automatically ascertaining test coverage of a software application specification document. In one embodiment, an assertion coverage tool interfaces with an assertion document corresponding to a software application specification and respective static XML files of test suites executing the software application so as to determine the extent of test coverage of the software application specification. It should be appreciated that the present invention can be implemented in numerous ways, including as a process, an apparatus, a system, a device, or a method. Several inventive embodiments of the present invention are described below.

In one embodiment, a method for analyzing a test coverage of a software application specification by a test suite is provided. The method includes reading an assertion document for a specification. The assertion document has a corresponding tagged assertion for each assertion in the specification. Each tagged assertion is defined in a markup language. The method also includes reading a static file for defining tests of the test suite. The static file is defined in the markup language. The test suite is divided into tests and each test is divided into test cases. The static file is configured to include an entry for each test case and each entry is configured to include tagged assertions tested by the test case. Also included in the method is correlating each of the tagged assertions in the assertion document with the test cases in the static file so as to determine test coverage of the specification.

In another embodiment, a method for analyzing a test coverage of a plurality of software application specifications by a plurality of test suites is provided. The method includes reading assertion documents for each specification. Each assertion document has a corresponding tagged assertion for each assertion in the respective specification. Each tagged assertion is defined in a markup language. The method also includes reading a static file defining tests of each test suite. Each static file is defined in the markup language. Each test suite is divided into tests and each test is divided into test cases. Each static file is configured to include an entry for each respective test case and each entry is configured to include tagged assertions tested by the test case. The method further includes correlating each of the tagged assertions in each assertion document with test cases in the corresponding static file so as to determine test coverage of each specification by each test suite.

In yet another embodiment, a computer program embodied on a computer readable medium for analyzing a test coverage of a software application specification is provided. The computer program includes program instructions for interfacing with an assertion file containing a plurality of assertions defined in the specification. The computer program also includes program instructions for interfacing with a static file for a test suite. The test suite is configured to test the specification. The computer program also includes program instructions for correlating data from the assertion file with data in the static file so as to provide a response to a request for a particular data. Also included in the computer program are program instructions for receiving the request for the particular data.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 1B-2 depicts the XML representation of a plurality of assertions in a chapter of the specification document, in accordance with yet another embodiment of the present invention.

FIG. 1B-3 depicts the XML representation of a plurality of assertions in a chapter of the specification document, in accordance to still another embodiment of the present invention.

FIG. 1B-4 depicts the XML representation of a plurality of assertions in a chapter of the specification document, in accordance to yet another embodiment of the present invention.

FIG. 1B-5 depicts the XML representation of a plurality of assertions in a chapter of the specification document, in accordance with still another embodiment of the present invention.

FIG. 2 is a simplified block diagram illustrating the interfacing of an assertion coverage tool interfacing with a plurality of static XML files and assertion documents, in accordance to still another embodiment of the present invention.

FIG. 3D-1 depicts a specification and the corresponding assertion document, in accordance to still another embodiment of the present invention.

FIG. 3D-2 depicts a specification and the corresponding assertion document, in accordance to yet another embodiment of the present invention.

FIG. 3D-3 depicts a specification and the corresponding assertion document, in accordance to still another embodiment of the present invention.

FIG. 3E-1 depicts a test suite structure, in accordance to yet another embodiment of the present invention.

FIG. 3E-2 depicts a test suite structure, in accordance to still another embodiment of the present invention.

FIG. 3F-1 depicts a static XML file corresponding to the test suite shown in FIG. 3E-1, in accordance to yet another embodiment of the present invention.

FIG. 3F-2 depicts a static XML file corresponding to the test suite shown in FIG. 3E-2, in accordance to still another embodiment of the present invention.

FIG. 3G depicts an assertion coverage file created by an exemplary assertion coverage tool, in accordance to yet another embodiment of the present invention.

FIG. 5 is a flow chart diagram of method operations performed by an exemplary assertion coverage tool, in accordance with still another embodiment of the present invention.

DETAILED DESCRIPTION OF THE PREFERRED EMBODIMENTS

Figure 1A:
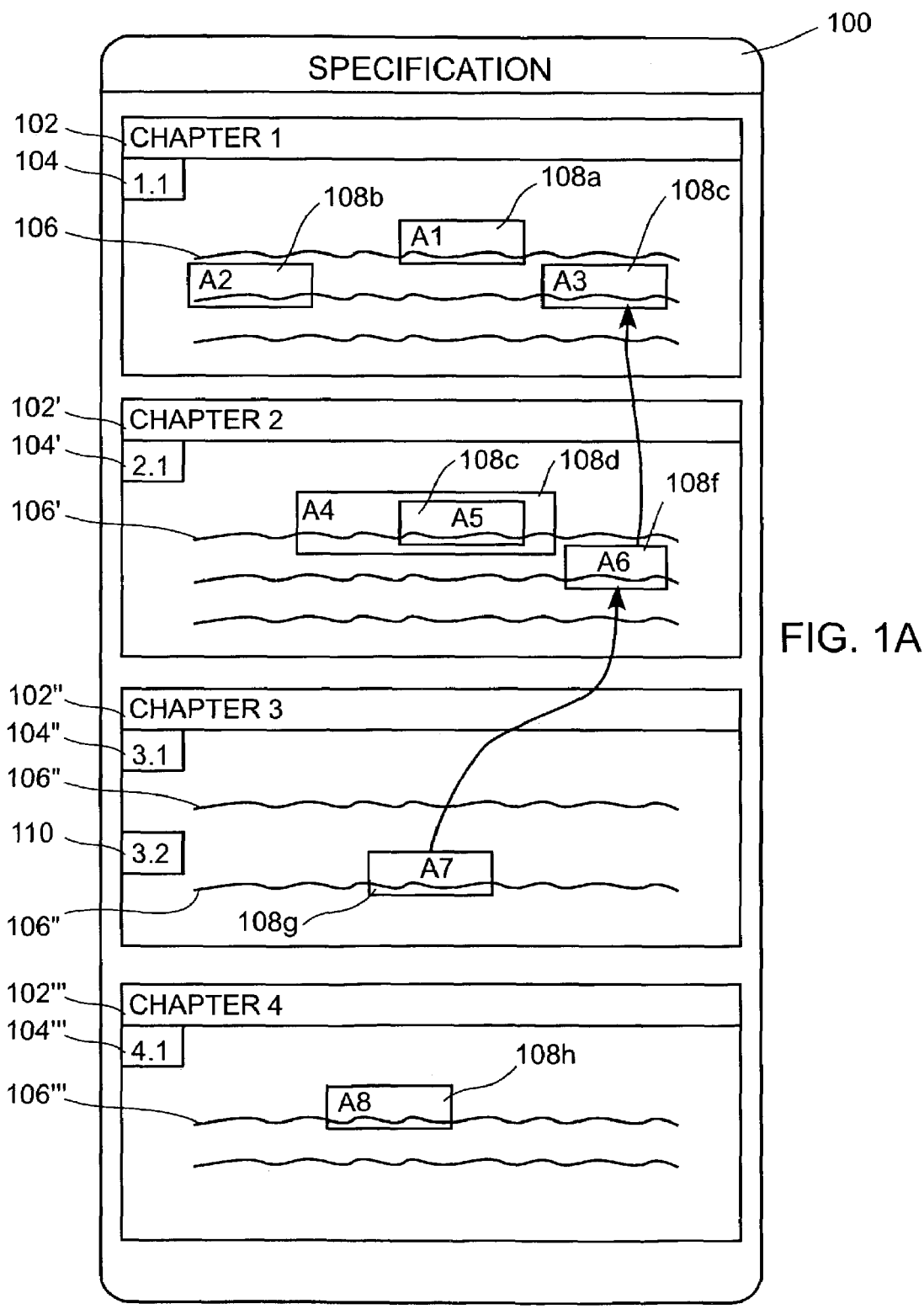
FIG. 1A is a simplified illustration of an exemplary software specification, in accordance with one embodiment of the present invention.

Inventions for simplifying software application specification testing by enhancing and facilitating test coverage determination of software application specifications, are disclosed. In one embodiment, an assertion coverage tool interfaces with an assertion document corresponding to a software application specification and respective static XML files of test suites executing the software application so as to determine the extent of test coverage of the software application specification. In one example, the assertion document is a representation of the specification document using markup language tags (e.g., Extensible Markup Language (XML)). The static XML document is an XML file that corresponds to each test suite processing the specification documents. In one embodiment, a user implements an Extensible Stylesheet Language (XSLT) Stylesheet to query the assertion coverage tool and view a corresponding coverage file after transforming of coverage file into a Hyper Text Markup Language (HTML) document.

It will be understood, however, to one skilled in the art, that the present invention may be practiced without some or all of these specific details. In other instances, well known process operations have not been described in detail in order not to unnecessarily obscure the present invention.

As embodiments of the present invention implement the Enterprise JavaBeans (EJB) application, a brief introduction to EJB architecture is provided below. EJB is part of a larger overall technology known as the Java 2 Platform, Enterprise Edition (J2EE) developed by Sun Microsystems, Inc. J2EE provides architecture for developing, deploying, and executing applications in a distributed-object environment.

Summarily, EJB architecture promotes the creation of re-usable server-side behaviors or instructions in the Java language, connectors to enable access to existing enterprise systems, and easy-to-deploy program modules. The EJB architecture creates a collaborative architecture to provide services virtually anywhere, and for a wide range of customers and devices.

The EJB architecture defines a model for the development and deployment of reusable Java server components called EJB components (i.e., EJB beans). As designed, the EJB component is a non-visible server component having methods that provide business logic in a distributed application. In one example, the EJB architecture includes the EJB client and the EJB server. The EJB client is configured to provide the user-interface logic on a client machine and to make calls to remote EJB components on a server. For instance, the EJB client is provided the information as to how to find the EJB server and how to interact with the EJB components.

In one example, the EJB client does not communicate directly with the EJB component. In one aspect, the EJB container provides the client proxy objects that implement the home and remote interfaces of the component. In one example, the remote interface is configured to define the business methods that can be called by the client. In another embodiment, the client is configured to invoke the methods resulting in the updating of the database. Thus, the EJB beans are reusable components that can be accessed by client programs. The application programmer codes the business logic into the EJBs and deploys them into a J2EE compliant server. In one example, the server complying with the J2EE specification provides the required system-level services, thus allowing the application programmer to concentrate on business logic.

The EJB server (i.e., the EJB application) includes an EJB container, which in one example provides the services required by the EJB component. For instance, the EJB container may be configured to include one of an EJB home interface or EJB Remote interface and EJB beans. In one embodiment, the EJB home interface and the EJB remote interface are defined in the same Java virtual machine. In a different embodiment, the EJB home interface and the EJB remote interface may be defined on different Java virtual machines or separate physical computers.

In one example, the EJB specification defines a container as the environment in which one or more EJB components execute. In accordance to one example, the EJB container provides the infrastructure required to run distributed components thus allowing the clients and component developers to focus on programming business logic. Simply stated, the container manages the low-level communications between the clients and the EJB beans. In one example, once an EJB bean is created by a client, the client invokes methods on the EJB bean as if the EJB beans were running in the same virtual machine as the client.

Furthermore, the clients are unaware of activities on the EJB bean, since the container is configured to sit between the clients and the EJB beans. For instance, if an EJB bean is passivated, its remote reference on the client remains intact. Thus, when the client later invokes a method on the remote reference, the container activates the EJB bean to service the request.

The EJB container encapsulates:

The client runtime and generated sub classes. In one example, this allows the client to execute components on a remote server as if the components were local objects.

The naming service allows the clients to instantiate components by name. It further allows components to obtain resources (e.g., database connections, etc.) by name.

The EJB server component dispatcher, which in one example, executes the component's implementation class and provides services such as transaction management, database connection pooling, and instance lifecycle management.

In one example, three types of EJB components can be enumerated.

Stateful session Beans: A stateful session bean manages complex processes or tasks that require the accumulation of data. They further manage tasks that require more than one method call to complete but are relatively short lived, store session state information in class instance data, and have an affinity between each instance and one client from the time the client creates the instance until it is destroyed by the client or by the server.

Stateless session Beans: A stateless session bean manages tasks that do not require the keeping of client session data between method calls. Furthermore, the method invocation by a stateless session bean does not depend on data stored by previous method invocations, there is no affinity between a component instance and a particular client, and different instances of the stateless session beans are seemed identical to the client.

Entity Beans: An entity bean model is a business model that is a real-world object which methods are run on the server machine. When the entity bean method is called, the program's thread stops executing and control is passed to the server. When the method returns from the server, the local thread resumes executing. In one example, the entity beans have the following characteristics: Each instance represents a row in a persistent database relation (e.g., a table, view, etc.); and The bean has a primary key that corresponds to the database relation's key which is represented by a Java data type or class.

Each EJB component further has a transaction attribute configured to determine the manner the instances of the component participate in transactions. As designed, the EJB container provides services which can include transaction and persistence support to the EJB components. As to the transaction support, the EJB container is configured to support transactions. In one example, when the bean is deployed, the EJB container provides the necessary transaction support. In regard to the persistence support, the EJB container is configured to provide support for persistence of the EJB components, which in one embodiment, is defined as the capability of the EJB component to save and retrieve its state. In this manner, the EJB component does not have to be re-created with each use.

In one example, the EJB architecture is a three-tiered architecture in which the clients reside on the first tier, the application server and the components (i.e., EJB beans) reside on the second tier, and the databases reside on the same host as the EJB server. In accordance to one implementation, the EJB server executes methods on a component from the client or another component, retrieves data from databases, and performs other communications. The EJB server further handles the details of transactions, threads, security, database connections, and network communication. Summarily, the EJB clients request business-logic services from EJB beans running on the second-tier. The EJB beans then use the system services provided by the second-tier server to access data from existing systems in the third tier. The EJB beans apply the business rules to the data, and return the results to the clients in the first-tier.

In one example, the client contains the user interface. The business logic is configured to be separate from both the clients and the databases and resides in the same tier (i.e., second tier) as components that analyze data, perform computations, or retrieve information from data sources and processes.

As EJB implements the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and Intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Keeping this brief overview to Enterprise Java Beans and Java in mind, reference is made to FIG. 1A illustrating an exemplary software specification 100, in accordance with one embodiment of the present invention. The software specification 100 includes a plurality of chapters, chapter 1 102 through chapter 4 102′″. As shown, each of the chapters, chapter 1 102, chapter 2 102′, chapter 3 102″, and chapter 4 102′″ respectively include sections 104–104′, 110, and 104″–104′″.

Each of the chapters 102 through 102′″ contains text 106 through 106′″, which as shown, each includes a plurality of assertions. In one example, the assertions can easily be identified while in a different example, the assertions are identified upon a closer inspection of the text by an assertion writer. As used herein, the assertion writer is the person who transforms the specification document into an assertion document.

In the embodiment of FIG. 1A, the text 106 includes a plurality of assertions, first assertion 108a, second assertion 108b, and third assertion 108c. The text 106′ contained within section 1.1 104′ of the chapter 102′ includes a fourth assertion 108d, a fifth assertion 108e, and a sixth assertion 108f. As shown, the fourth assertion 108d has a sub-assertion, is the fifth assertion 108e. As can further be seen, the sixth assertion 108f depends on the third assertion 108c. The text 106″ includes a seventh assertion 108g while the text 106′″ includes an eight assertion 108h. The seventh assertion 108g in turn depends on the third assertion 108c.

Figures 1, 1B:
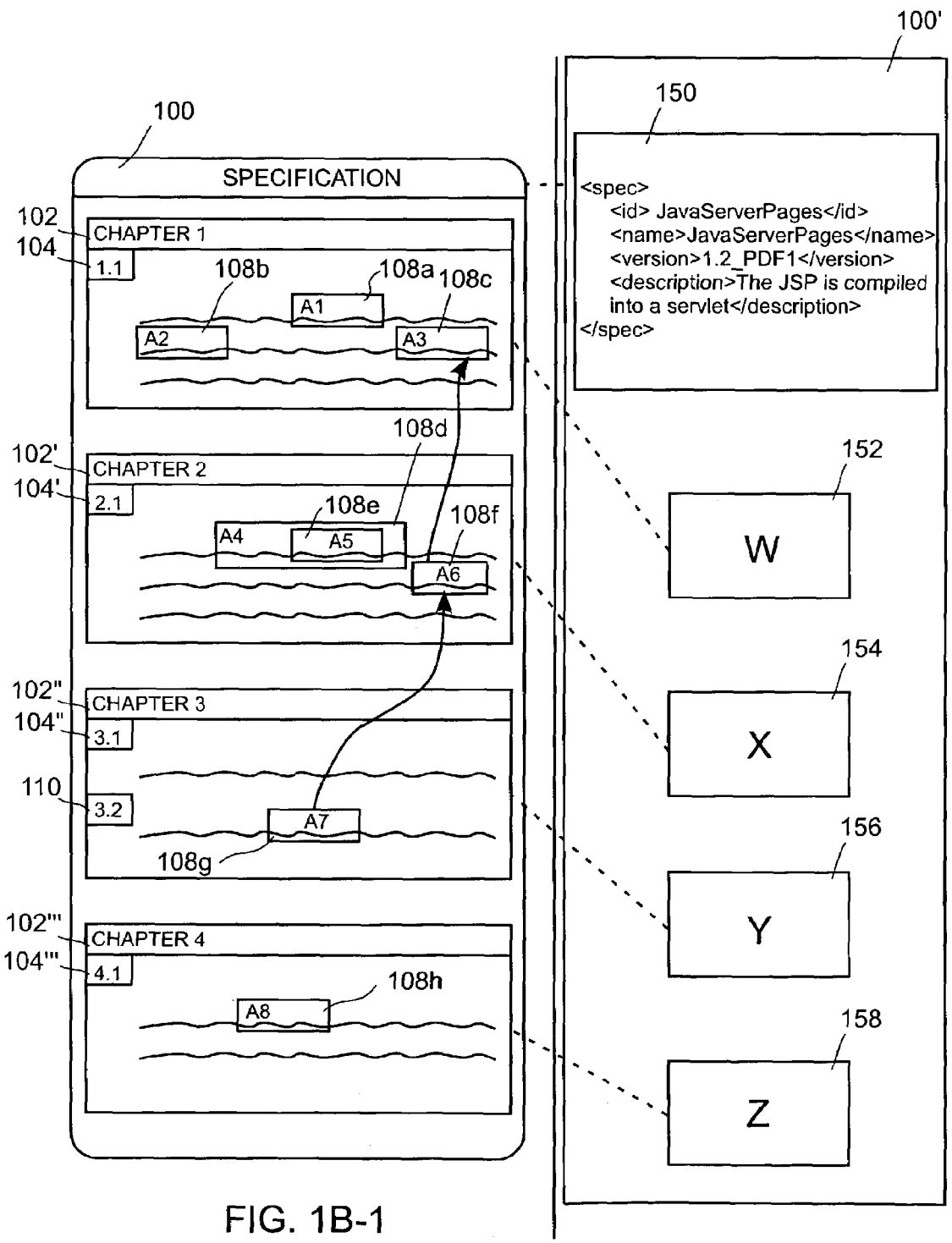
FIG. 1B-1 is a simplified diagram illustrating creating of an assertion document by tagging the plurality of assertions in the text of a software specification, in accordance with another embodiment of the present invention.

Creating an assertion document 100′ by tagging the plurality of assertions in the text of software specification 100 is shown in the simplified diagram in FIG. 1B-1, in accordance with one embodiment of the present invention. The assertion document 100′ includes a specification box 150 and a plurality of chapter boxes 152 through 158, each corresponding to one of the chapters 102 through 104, respectively. The specification box 150 is designed to include information about the specification document 100 while assertion boxes 152 through 158 are configured to include information about all assertions included in the corresponding chapters 102 through 102′″.

In one embodiment, an assertion document type definition ("DTD") is configured to provide an XML DTD for defining the assertion document. The XML DTD is designed to provide the test developers or the users the format of the assertion document. In one example, comments in the XML DTD provide additional requirements for the syntax and semantics of XML elements in the assertion document. Several exemplary XML elements are provided below:

Element spec: In one example, the spec element is configured to be the root of assertion.dtd. In one embodiment, the spec element defines the elements needed for expressing the specification document using the XML format. In one instance, the spec element requires the identification, name, version, define, and chapter+ elements to describe the specification document. As designed, the name is configured to be the same as the name of specification document.

ID Element: In one example, the id element is configured to describe a unique characteristic of the element.

Name element: In one instance, the name element describes the name of the specification element. As designed, the name is configured to be unique when the name is used across more than one <define> element.

Version Element: According to one embodiment, the version element is configured to describe the version of the specification document.

Define Element: In one embodiment, the define element can be implemented to combine multiple assertion elements in a single assertion element. For instance, when an assertion covers more than one technology, the assertion writer may use the define element to refer to all the technologies. In one instance, a tool can be implemented to expand the assertion for each technology using the sub-assertion element. In one implementation, an assertion can use the define element by describing a <name-link> element in the value of the <name> element: For example, Table 1 includes an exemplary XML representation.

TABLE 1

Exemplary XML Representation

```
<assertion>
    <id>EJB:2.0_PFD2:1:2:2</id>
    <name> /ejb/<name-link> Enterprise Beans </name-link>/ejbCreate
    </name>
    <description> ... </description>
    ....
</assertion>
<assertion>
```

TABLE 1-continued

Exemplary XML Representation

```
            <id> EJB:2.0_PFD2:1:2:2</id>
            <name> /ejb/<name-link> Enterprise Beans </name-link>/ejbCreate
            </name>
            <description> ... </description>
            ..
            <sub-assertions>
                <sub-assertion>
                    <id> EJB:2.0_PFD2:1.2.2#1 </id>
                    <name> /ejb/Statefull Session Bean/ejbCreate </name>
                    <description> ... </description>
                </sub-assertion>
                <sub-assertion>
                    <id> EJB:2.0_PFD2:1.2.2#2 </id>
                    <name>/ejb/BeanManagedPersistence/ejbCreate
                    </name>
                    <description> ... </description>
                </sub-assertion>
            </sub-assertions>
</assertions>
```

In this manner, once the <name-link> element is expanded, the define element can be removed from the assertion document.

Union Element: In one instance, the union element describes almost all the <name> elements used to describe the name of a higher level assertion.

Element Element: According to one embodiment, the element element defines the name of a sub-assertion.

Name-link Element: In one example, the name-link element is used in conjunction with the <define> element. In one instance, the name-link element can be configured to refer to a define name element.

Chapter Element: According to one embodiment, the chapter element is configured to contain almost all the information implemented to describe a specification document using XML. In one example, the name element is configured to be almost identical to the name of the associated specification. The description is configured to be a short sentence describing an overview of the chapter. In one example, a chapter can also define some assertions. However, in one instance, the assertions are configured to be defined at the section level.

Description Element: In one example, the description element contains a full description of the element. If the description element is used with the assertion element, the description element is configured to contain information describing the assertion in more detail. To the extent possible, the description is designed to be taken from the specification.

Section Element: In one example, the section element is configured to contain almost all the information required to describe a specification section. The name element is configured to be substantially the same as the specification section name. The description is designed to be a short sentence providing an overview of the section.

Assertions Element: In one instance, the assertions element is configured to describe almost all the elements required to be implemented to express a specification assertion using XML.Assertion Element: In one instance, the assertion element is the XML view of a specification assertion. By way of example, the identification and the name elements are configured to be unique while the description is designed to be taken integrally from the specification document. In one embodiment, keywords can be used to describe an assertion and the spec-refs element can be used to refer to a different ID element. In one embodiment, if the assertion name includes a <define> element, the sub-assertion can be expanded by a tool or by the assertion writer.

An assertion can further include attributes to describe the state of the assertion. In one example, the following attributes are included:

type: In one embodiment, the type attribute defines the assertion type, which in one example, can be one of positive, negative, untestable or deprecated.

predef: In accordance with one embodiment, the predef element is an assertion that was defined earlier in the document, which in one example, is used in a different context. Some specification documents are configured to repeat the assertion at the beginning of a section, chapter, etc.

optional: In one example, an assertion can be optional. In one instance, an assertion attribute can be assigned to be either true or false. In one embodiment, when the specification includes certain recommendations regarding the assertion, the default attribute of an assertion is assigned to be false. Otherwise, in a different aspect, the assertion attribute is assigned to be true.

implementation_specific: In one example, an assertion can be product specific. In one example, the specification recommends a behavior of the assertion.

category: In one example, the category attribute is the characteristic of the assertion. For instance, the assertion can be classified under:

spec: In one embodiment, a specification assertion is an assertion that the entire product must realize. In one example, the specification assertion is configured to implement a specification feature uniformly throughout the specification. Usually, the description of the assertion contains words such as: "must," "may," "should," etc. In one example, optional or implementation specific assertions can also be marked as spec assertions.

usage: In one instance, the usage attribute is used when an assertion contains a sub-assertion using the <depend> element. In one example, the usage assertion is designed to address a more complex scenario than a spec assertion.

Algorithm: In one instance, the algorithm is an assertion that represents an algorithm.

According to one example, an assertion writer takes the following items in consideration:

In one instance, when possible, the assertion description is configured to be taken from the specification without changing the wording.

In one embodiment, a usage assertion is composed of more than one specification assertion.

For instance, a high level assertion uses the predef element to refer to the assertion it is describing.

In one example, if an assertion description contains must, should, may, etc., the assertion is an spec assertion.

In accordance to one implementation, substantially all assertions should be represented within the assertion document even if the assertion is difficult to test.

By way of example, the keyword element is configured to be used as many time as possible. In one embodiment, an assertion can have more than one keyword associated with it.

In one instance, in an attempt to avoid duplication, the assertion writer is configured to confirm that the assertion was not previously defined in the document.

Keywords Element: In accordance with one embodiment, the keywords element is configured to define a set of keywords associated with an assertion. In one instance, a tool or XSLT Stylesheet can be used to extract assertions based on the keywords.

Keyword Element: In one embodiment, the keyword element is designed to describe a keyword associated with an assertion. According to one embodiment, a tool or XSLT Stylesheet can be used to extract assertions based on their respective keywords.

Spec-refs Element: In one example, the spec-refs element is configured to describe a secondary ID for the assertion. For instance, an assertion can have a plurality of identifications referenced in the <spec-ref> element. In one embodiment, the <id> element can be referenced using the <spec-ref> element. An exemplary spec-refs is provided below in Table 2.

TABLE 2

Exemplary XML Representation Using XML

```
<id> J2EE:1.3:1:1.1 </id>
<spec-refs>
    <spec-ref> j2ee:1.2:1:1.2 </spec-ref>
<spec-refs>
```

Spec-ref Element: In one example, the spec-ref element is configured to describe a different <id> implemented to reference an assertion. In one embodiment, the identifications can be used when the specification is revised.

In one embodiment, the assertion document may not contain any links to the XSLT Stylesheet file. In such a scenario, a tool capable of transforming the XML assertion document into another document having a different format (ex: html) is configured to be used.

In accordance to one embodiment, an exemplary XML DTD is provided in Table 3.

TABLE 3

Exemplary XML DTD for an Assertion Document

```
<!--
This is an example of the XML DTD for assertion documents.
-->
    <?xml version="1.0" encoding="UTF-8"?>
        <!DOCTYPE spec SYSTEM
'http://sardinia.sfbay:8080/ejte/assertion/dtds/assertions.dtd'>
<!--
In accordance with one example, the spec element is the root of assertion.dtd. It
defines the elements needed for expressing the specification document using XML
format. The name is the same as the specification document.
-->
<!ELEMENT spec ( id, name, version, define*, chapter+ )>
<!--
The id element describes the unique id of an element.
Used in: spec, chapter, section, assertion, sub-assertion, and define
-->
<!ELEMENT id (#PCDATA)>
<!--
In one example, the name element describes the name of the specification element.
The name is configured to be unique when it is used across more than one <define>
element.
Used in: spec, chapter, section, assertion, sub-assertion, and define
-->
<!ELEMENT name (#PCDATA|name-link)*>
<!--
By way of example, the version element describes the version of the specification
document.
Used in: spec
-->
<!ELEMENT version (#PCDATA)>
<!--
In accordance with one embodiment, the define element is used to combine multiple
assertion <name> element in a single assertion. When an assertion covers more that
one technology, the assertion writer may use the define element to reference all the
technologies. Later, a tool can expand each technology assertion using the sub-
assertion element. For instance:
    <define>
        <id> EJB:1 </id>
        <name> Enterprise Beans </name>
        <union>
            <element> Stateless Session Bean </element>
            <element> Stateful Session Bean </element>
            <element> Bean Managed Persistence </element>
            <element> Container Managed Persistence </element>
            <element> Message-Driven Bean </element>
        </union>
    </define>
In accordance with one embodiment, an assertion can use the define element by
defining a <name-link> element in the <name> value:
    <assertion>
        <id>EJB:2.0_PFD2:1:2:2 </id>
```

TABLE 3-continued

Exemplary XML DTD for an Assertion Document

```
                <name> /ejb/<name-link> Enterprise Beans </name-
                link>/ejbCreate</name>
                <description>...</description>
                ....
        </assertion>
Thereafter, a tool can be used to expand the <define> element:
        <assertion>
                <id> EJB:2.0_PFD2:1:2:2 </id>
                <name> /ejb/<name-link> Enterprise Beans </name- link>/ejbCreate
                </name>
                <description> ... </description>
                ...
                <sub-assertions>
                        <sub-assertion>
                                <id> EJB:2.0_PFD2:1.2.2#1 </id>
                                <name> /ejb/Statefull Session Bean/ejbCreate </name>
                                <description> .... </description>
                        </sub-assertion>
                        <sub-assertion>
                                <id> EJB:2.0_PFD2:1.2.2#2 </id>
                                <name>/ejb/BeanManaged
                                Persistence/ejbCreate</name>
                                <description> .... </description>
                        </sub-assertion>
                </sub-assertions>
        </assertions>
It must be noted that in one example, although not required, once the <name-link>
element has been expanded, the define element can be removed from the document.
Used in: name
-->
<!ELEMENT define (id, name, description, union)>
<!--
In one example, the union element describes the <name> elements used to describe a
higher level assertion name.
Used in: define
-->
<!ELEMENT union (element+)>
<!--
In accordance to one embodiment, the element defines the name of a sub-assertion.
Used in: union
-->
<!ELEMENT element (#PCDATA)>
<!--
According to one embodiment, the name-link element is used in conjunction with a
<define> element. The name-link element references a define name element.
Used in: name
-->
<!ELEMENT name-link (#PCDATA)>
<!--
In one example, the chapter element contains almost all the required information used
to describe a chapter in the specification document using XML. The name element is
the associated specification chapter name. The description is configured to be a short
sentence describing an overview of the chapter. In one embodiment, although
assertions are defined at the section level, a chapter can also define some assertions.
Used in: spec
-->
<!ELEMENT chapter ( id, name, description, assertions?, section*, spec-refs? )>
<!--
In accordance to one embodiment, the description element contains a full description
of the element. In one example, when used with the assertion element, the description
contains information describing the assertion in detail. If possible, the description is
taken integrally from the specification.
Used in: spec, chapter, section, define, assertion, and sub-assertion.
-->
<!ELEMENT description (#PCDATA)>
<!--
In one instance, the section element contains the required information to describe a
specification section using XML. The name element is configured be the name of
specification section. The description can be a short sentence providing an overview
of the section.
Used in: chapter
-->
<!ELEMENT section ( id, name, description, assertions?, spec-refs? )>
<!--
In one example, the assertions element describes the required elements used for
expressing a specification assertion using XML.
Used in: chapter and section.
```

TABLE 3-continued

Exemplary XML DTD for an Assertion Document

```
-->
<!ELEMENT assertions ( depends*, assertion* )>
<!--
In one example, the assertion element is an XML view of a specification assertion.
The id and the name elements are configured to be unique while the description is
designed to be taken integrally from the specification. Keywords can be used to
describe an assertion. <spec-refs> can be used to refer to a different ID element. In
accordance with one implementation, if the assertion name uses a <define> element,
sub-assertion can be expanded by a tool or the assertion writer. An assertion may also
have the following attributes used for describing the state of the assertion:
    type: In one instance, the type attribute defines the assertion type (e.g.,
    positive, negative, untestable, deprecated, etc.)
    predef: By way of example, an assertion can be defined earlier in the
    document and be used in a different context later on in the document. In
    accordance to one embodiment, the specification document repeats the
    assertion at the beginning of a section, a chapter, etc.
    optional: In one instance, an assertion can be optional (e.g., true or false).
    implementation_specific: According to one embodiment, an assertion can be
    product specific.
    Category: In one instance, the category is the category under which the
    assertion can be classified. By way of example, the assertion can be classified
    under:
        Spec: In one instance, a specification assertion is an assertion that
            products realize. Usually, the assertion description contains words
            such as "MUST," "MAY," "SHOULD," etc. According to one
            example, optional or implementation specific assertions can also be
            marked as a spec assertion.
        Usage: In one embodiment, the usage assertion is an assertion that
            contains a sub-assertion which uses the <depend> element. By way
            of example, the usage assertion can consist of a more complex
            scenario than a spec assertion.
        Algorithm: In one embodiment, the algorithm assertion is an assertion
            that represents an algorithm.
Used in: assertions
-->
<!ELEMENT assertion (id, name, description, depends*, spec-refs?, sub-assertions*,
keywords* )>
<!ATTLIST assertion
    type ( positive | negative | deprecated | untestable) "positive"
    predef CDATA #IMPLIED
    optional (true | false) "false"
    implementation_specific (true | false) "false"
    category (spec | usage | algorithm ) #IMPLIED>
<!--
In one instance, the keywords element defines a set of keywords associated with an
assertion. A tool or XSLT Stylesheet can be used to extract assertions based on the
keywords.
Used in: assertion
-->
<!ELEMENT keywords (keyword+)>
<!--
In one instance, the keyword element describes a keyword associated with the
assertion. A tool or XSLT Stylesheet can be used to extract assertions based on their
respective keywords.
Used in: keyword
-->
<!ELEMENT keyword (#PCDATA)>
<!--
In one example, the depends element contains all the dependencies of an assertion, a
section, a chapter, etc. The depend element is used to describe a scenario in which a
second assertion can be realized after a first assertion has been realized.
    <assertion>
        <id> EJB:2.0_PFD2:1:2:2 </id>
        <name> /ejb/<name-link> Enterprise Beans </name-link>/ejbCreate
        </name>
        <description> ... </description>
        .<depends>
            <depend> EJB:2.0_PFD2:1:1:1 </depend>
        </depends>
    </assertion>
Used in: chapter, section, and assertion.
-->
<!ELEMENT depends (depend+)>
<!--
By way of example, the depends order attribute is used when the execution of one
assertion follows the execution of multiple assertions. Ex:
    Assertion 3 must always occur after assertion 1 and assertion 6
```

TABLE 3-continued

Exemplary XML DTD for an Assertion Document

```
                <depends order="assertion 1, assertion 6">
                    <depend> assertion 1 </depend>
                    <depend> assertion 6 </depend>
                </depends>
Used in: depend
-->
<!ATTLIST depends
        order CDATA #IMPLIED>
<!--
In one example, the depend element describes the dependency of an assertion on
another assertion. In one instance, the element value is an assertion <id> value.
Used in: depends
-->
<!ELEMENT depend (#PCDATA)>
<!--
In one example, the spec-refs element describes a secondary ID for the assertion. An
assertion can have multiple id(s) referenced in the <spec-ref> element.
        <id> J2EE:1.3:1:1.1 </id>
        <spec-refs>
            <spec-ref> j2ee:1.2:1:1.2 </spec-ref>
        <spec-refs>
In one embodiment, the <id> element can be referenced using the <spec-ref> element.
Used in: assertion
-->
<!ELEMENT spec-refs (spec-ref+)>
<!--
According to one implementation, the spec-ref element describes a different <id> used
for referencing an assertion. These IDs can be used when the specification changes.
Used in: spec-refs
-->
<!ELEMENT spec-ref (#PCDATA)>
<!--
In one instance, the sub-assertions element is used to expand an assertion name that
contains a <name-link> element to a <define> element. The spec-ref element can be
defined manually (i.e., meaning without using a tool, the define element, or the name-
link element).
Used in: assertion
-->
<!ELEMENT sub-assertions (sub-assertion+)>
<!--
In one example, the sub-assertion element expands an assertion based on the <define>
element. The ID of a sub-assertion follows the following rule:
            <assertion parent is> + # + unique id
Ex:
        <assertion>
            <id> EJB:2.0_PFD2:1:2:2 </id>
            <name> /ejb/<name-link> Enterprise Beans </name-
            link>/ejbCreate</name>
            <description> ... </description>
            ..
            <sub-assertions>
                <sub-assertion>
                    <id> EJB:2.0_PFD2:1.2.2#1 </id>
                    <name> /ejb/Statefull Session Bean/ejbCreate </name>
                    <description> .... </description>
                </sub-assertion>
                <sub-assertion>
                    <id> EJB:2.0_PFD2:1.2.2#2 </id>
                    <name>/ejb/BeanManaged
                    Persistence/ejbCreate</name>
                    <description> .... </description>
                </sub-assertion>
            </sub-assertions>
        </assertions>
-->
<!--
In one example, the sub-assertion element is an XML view of a specification assertion.
According to one embodiment, the id and the name element are unique and the
description is taken integrally from the assertion that the sub-assertion is realized. In
one instance, a sub-assertion has attributes used for describing the state of the
assertion:
    type: In one example, the type element defines the sub-assertion type (e.g.,
        positive, negative, untestable, deprecated, etc.)
    predef: In one embodiment, a sub-assertion can be defined earlier in the
        document and be used in a different context later on in the document. By way
        of example, some specification documents repeat the sub-assertion at the
        beginning of a section, chapter, etc.
```

TABLE 3-continued

Exemplary XML DTD for an Assertion Document optional: In one example, a sub-assertion can be optional (e.g., true or false).
implementation_specific: In accordance to one embodiment, a sub-assertion
can be product specific.
Category: By way of example, the category under which the assertion can be
categorized. According to one implementation, the sub-assertion can be
classified under:
    spec: In one example, a specification sub-assertion is an assertion that
        products realize. Usually, the sub-assertion description contains
        words like "MUST," "MAY," "SHOULD," etc. Optional or
        implementation specific assertions can also be marked as spec
        assertions.
    usage: In accordance to one embodiment, the usage assertion is an
        assertion that contains a sub-assertion which uses the <depend>
        element. The usage assertion can consist of a more complex
        scenario than a spec assertion.
    Algorithm: A sub-assertion that represents an algorithm.
Used in: assertion
<!ELEMENT sub-assertion (id, name, description?)>
<!ATTLIST sub-assertion
    type ( positive | negative | deprecated | untestable) "positive"
    predef CDATA #IMPLIED
    optional (true | false) "false"
    implementation_specific (true | false) "false"

With a continued reference to FIG. 1B-1, in one example, the assertion writer is configured to include the following information about the specification document 100 in the specification box 150:

Specification name: In one example, the assertion writer is configured to assign a logical name to each specification document;

Specification id: In one embodiment, the assertion writer is configured to assign an ID to each specification document. The ID is designed to be unique across an assertion document. An exemplary ID is:

ejb (for Enterprise Java bean)

Specification version: In one instance, the assertion writer is configured to assign a unique specification version for each assertion document. In one example it is the specification version.

Table 4 includes the contents of the specification box 150.

TABLE 4

Exemplary XML Representation in a Specification Box

<spec>
    <id> Java Server Pages <id>
    <name> Java Server Pages </name>
    <version> 1.2_PDF1 </version>
    <description> The JSP is compiled into a servlet </description>
</spec>

The contents of exemplary assertion boxes 152 through 158 are discussed in more detail below with respect to FIGS. 1B-2 through 1B-5.

Figures 1, 1B, 2:
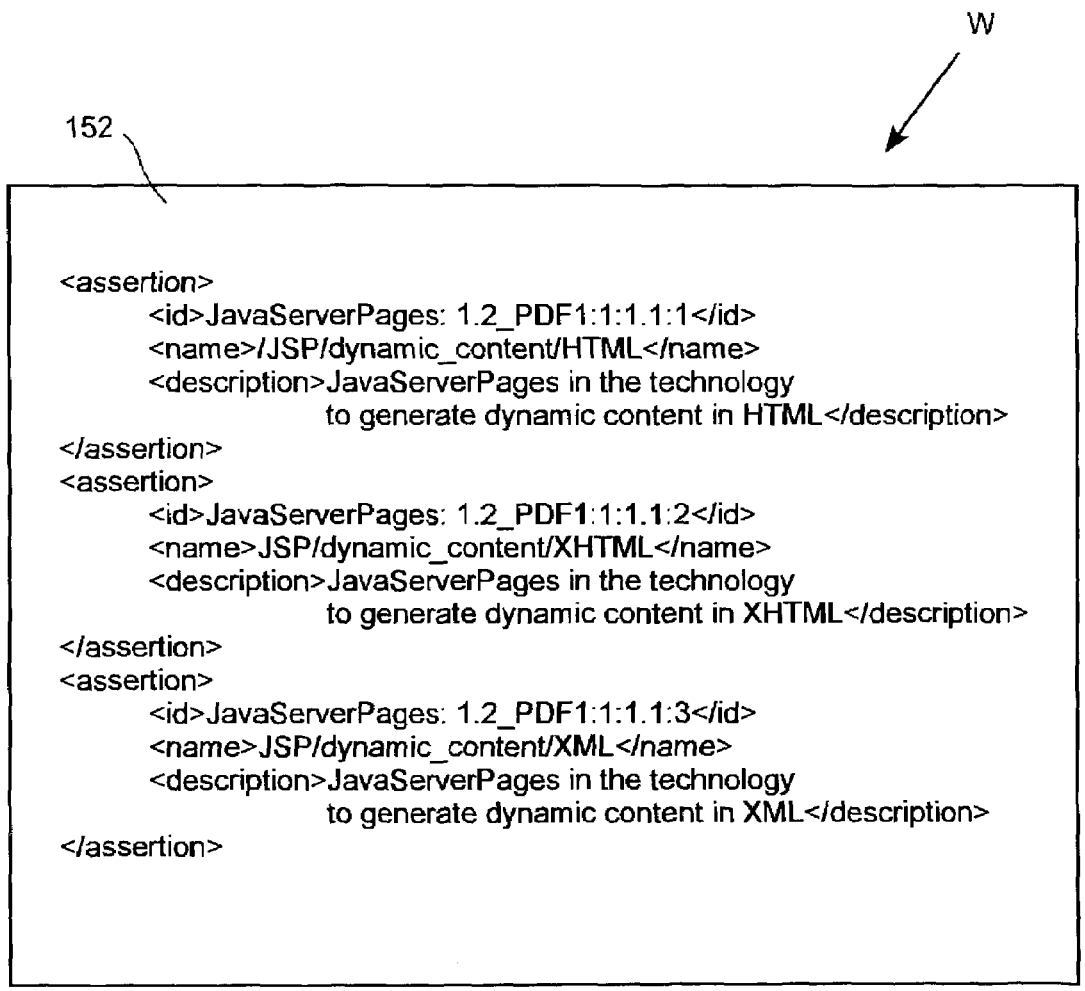

FIG. 1B-2 depicts the contents of an assertion box 152, in accordance with one embodiment of the present invention. In one example, an assertion box is configured to include the following information:

Chapter name: In one example, the assertion writer is configured to re-use the specification chapter name when creating the assertion document. The chapter name is configured to be the same for both, the specification document and the assertion document.

Chapter id: In one instance, the assertion writer is configured to re-use the specification chapter number when creating the assertion document. The chapter id is designed to be the same for both specification and assertion document. The chapter id is designed to be unique.

Section name and sub-section name: In one implementation, the assertion writer is configured to re-use the specification section name or sub-section name when creating the assertion document. By way of example, the section name (or sub-section name) is designed be the same for both the specification and the assertion document.

Section id and sub-section id: In one embodiment, the assertion writer is configured to re-use the specification section number when creating the assertion document. The section id is designed to be the same for both the specification and assertion documents. Again, the section id is designed to be unique. In one instance, the uniqueness of the section id and subsection id is configured to be across the same section and same subsection elements within one particular chapter element.

Assertion name and sub-assertion name: In one example, the assertion writer is configured to assign a name to each of the assertions. The name is designed to be based on the descriptors such as: specification, technology, operation to achieve, etc. In one instance, each descriptor is configured to be separated using the "/" character. An example is:

/ejb/entity bean/container managed persistence/ ejb-Load

Assertion id and sub-assertion id: By way of example, the assertion writer is configured to assign a unique id to an assertion. The id is designed to be based on the specification id, the specification chapter, and the specification section where the assertion is defined.

Assertion keyword and sub-assertion keyword: In one example, the assertion writer may assign one or more keywords to an assertion. The keyword is configured to be based on certain criteria such as a behavior of the specification, the technology, etc.

Chapter, section and assertion ID definition: In one instance, the rule depicted in Table 5 is followed to define an element ID. In one example, this rule may not be applied to define a sub-assertion ID:

TABLE 5

Exemplary Assertion Rule

Specification ID:
Specification version + "_" + Specification release version:
Chapter number:
Section or sub-section number:
Unique ID:

An exemplary element ID is:

EJB:2.0_PFD2:1:1:1

Sub-assertion ID definition: In one instance, the rule in Table 6 is configured to be followed when defining a sub-assertion ID:

TABLE 6

Exemplary Assertion Rule

Specification ID:
Specification version + "_" + Specification release version:
Chapter number:
section number:
assertion unique ID + "#" + unique ID for sub-assertion In one example, it is recommended to assign a unique ID number starting from 0, 1, 2 . . . . An exemplary sub-assertion is:

EJB:2.0_PFD2:1:1:1#5

Referring back to FIG. 1B-2, representing the first, second, and third assertions 108a through 108c using the XML tags can further be understood, in accordance with one embodiment. In one example, the XML representation of the first assertion 108a is shown in Table 7.

TABLE 7

Exemplary First Assertion XML Tags

<assertion>
  <id> Java Server Pages: 1.2_PDF1:1:1.1:1 </id>
  <name> /JSP/dynamic-content/HTML </name>
  <description> Java Server Pages in the technology to generate dynamic content in HTML </description>
</assertion>

In a like manner, Table 8 contains the exemplary XML tag codes for the second assertion 108b and the third assertion 108c.

TABLE 8

Exemplary XML Representation

</assertion>
  <id> Java Server Pages: 1.2_PDF1:1:1.1:2 </id>
  <name> JSP/dynamic-content/XHTML </name>
  <description> Java Server Pages in the technology to generate dynamic
    content in XHTML </description>
</assertion>
</assertion>

TABLE 8-continued

Exemplary XML Representation

<id> Java Server Pages: 1.2_PDF1:1:1.1:3 </id>
  <name> JSP/dynamic-content/XML </name>
  <description> Java Server Pages is the technology to generate dynamic
    content in XML </description>
</assertion>

Referring now to FIG. 1B-3, XML representation of the assertions contained within the chapter 104' can further be understood, in accordance to one embodiment of the present invention. As illustrated, the fifth assertion 108e is the sub-assertion of the fourth assertion 108d. As used herein, the sub-assertion element is configured to expand an assertion using the <define> element. In one instance, the sub-assertion element is an XML view of an assertion in the specification document. In one example, the id and the name element of the sub-assertion is configured to be unique. Furthermore, in one instance, the description of the sub-assertion is taken integrally from the assertion the sub-assertion depends on.

In one embodiment, a sub-assertion ID may be designed to follow the rule in Table 9:

TABLE 9

Exemplary Sub-assertion Rule

<assertion parent id> + # + unique id

By way of example, the XML representation of the fourth assertion 108d and the sub-assertion 108e is shown in Table 10.

TABLE 10

Exemplary XML Sub-assertion Representation

<assertion>
  <id> Java Server Pages: 1.2_PDF1:2:2.1:1 </id>
  <name> /JSP/protocol/HTTP </name>
  <description> HTTP is the default protocol for requests and responses
  </description>
  <subassertions>
    <subassertion>
      <id> Java Server Pages: 1.2_PDF1:2:2.1:# </id>
      <name> JSP/Requests/JSP/Protocol/HTTP </name>
      <description> HTTP is the default protocol for
        requests
      </description>
    </subassertion>
  </subassertions>
</assertion>

In one implementation, the sub-assertion can be designed to have attributes to describe the state of the assertion. In one example, the sub-assertion has the following exemplary attributes:

type: In one example, the type attribute defines the sub-assertion type, which may be positive, negative, untestable, or deprecated.

predef: In one instance, a sub-assertion can be earlier defined in the document (i.e., duplicate) can be used in a different context. By way of example, some specification documents are designed to repeat the sub-assertion at the beginning of each section, chapter, etc.

optional: In one implementation, a sub-assertion can be designed to be optional. That is, the sub-assertion can be assigned a value of either true or false.

implementation_specific: By way of example, the sub-assertion can be configured to be product specific.

category: In one instance, the sub-assertion can be classified under the same category as the assertion. By way of example, the subassertion can be classified as:

spec: In one embodiment, a specification sub-assertion is an assertion that substantially all products must realize. In one instance, the sub-assertion description can be configured to contain words such as "MUST," "MAY," "SHOULD," etc. In one implementation, optional or implementation specific implementation can also be marked as spec assertion;

usage: In one instance, an assertion containing a sub-assertion implements the <depend> element. According to one embodiment, the <depend> element is configured to be a more complex scenario than a spec assertion; and algorithm: In one embodiment, algorithm assertion is a sub-assertion configured to represent an algorithm.

An exemplary multi sub-assertion XML representation is shown in Table 11.

TABLE 11

Exemplary Multi-sub-assertion XML Representation

```
<assertion>
    <id> EJB:2.0_PFD2:1:2:2 </id>
    <name> /ejb/<name-link> Enterprise Beans
    </name-link>/ejbCreate</name>
    <description> ... </description>
    ..
    <sub-assertions>
        <sub-assertion>
            <id> EJB:2.0_PFD2:1.2.2#1 </id>
            <name> /ejb/Statefull Session Bean/ejbCreate </name>
            <description> .... </description>
        </sub-assertion>
        <sub-assertion>
            <id> EJB:2.0_PFD2:1.2.2#2 </id>
            <name>/ejb/BeanManaged
            Persistence/ejbCreate</name>
            <description> .... </description>
        </sub-assertion>
    </sub-assertions>
</assertion>
-->
```

Furthermore, as discussed with respect to FIG. 1B-1, the sixth assertion 108f depends on the third assertion 108c requiring the execution of the third assertion 108c prior to the execution of the sixth assertion 108f. In one example, the dependency of one assertion on a different assertion is shown implementing the <depends> element. By way of example, dependency of the sixth assertion 108f on the third assertion 108c is shown in Table 12.

TABLE 12

Exemplary Assertion Dependency

```
<assertion>
    <id> Java Server Pages: 1.2_PDF1:2:2.1:2 </id>
    <name> JSP/Protocol/HTTPS </name>
    <description> HTTP is the secure protocol for requests and responses
    that JSP also supports </description>
    <depends>
        <depend> Java Server Pages: 1.2_PDF1:2:1.1:3 </depend>
    <depends>
</assertion>
```

In one instance, the depends element contains almost all the dependencies of an assertion, a section, or a chapter. By way of example, first assertion is required to be executed before a second assertion can be executed. As shown in Table 13, in one embodiment, the depend element is used to describe the dependency an assertion can have on another assertion. As designed, the element value is configured to be an assertion <id> value.

TABLE 13

Exemplary XML Representation Using the Depend Element

```
<assertion>
    <id> EJB:2.0_PFD2:1:2:2 </id>
    <name> /ejb/<name-link> Enterprise Beans </name-
    link>/ejbCreate</name>
    <description> ... </description>
    .<depends>
        <depend> EJB:2.0_PFD2:1:1:1 </depend>
    </depends>
</assertion>
```

Referencing to FIG. 1B-4, an XML representation of a multi-assertion dependency is illustrated in more detail, in accordance with one embodiment of the present invention. As shown, the seventh assertion 108g can be executed after the sixth assertion 108f has been executed. In turn, the sixth assertion 108f can be executed after the third assertion 108c has been executed. Thus, the seventh assertion 108g is executed after the third assertion 108c and the sixth assertion 108g have been executed.

The <depends order> attribute can be used to describe the scenario in which the execution of one assertion is designed to follow the execution of more than one assertions. An exemplary XML representation implementing <depends order> is shown in Table 14. In this scenario, an assertion "g" is configured to occur after assertion "a" and assertion "d."

TABLE 14

Exemplary XML Representation

```
<depends order="assertion a, assertion d">
    <depend> assertion b </depend>
    <depend> assertion c</depend>
</depends>
```

Thus, the XML representation of the seventh assertion is described below in Table 15.

TABLE 15

Exemplary XML Representation of Assertion 7

```
<assertion>
    <id> Java Server Pages: 1.2_PDF1:3:3.2:1 </id>
    <name> JSP/default-request-object/HTTP Servlet Request </name>
    <description> The default request object is expected to extend
    HTTP Servlet Request </description>
    <depends order = "Java Server Pages: 1.2_PDF1:1:1.1:3,
            Java Server Pages: 1.2_PDF1:2:2.1:3">
        <depend> Java Server Pages: 1.2_PDF1:1:1.1:3 </depend>
```

TABLE 15-continued

Exemplary XML Representation of Assertion 7

```
    <depend> Java Server Pages: 1.2__PDF1:2:2.1:3 </depend>
  </depends>
</assertion>
```

The XML representation of the eighth assertion 108 is shown in FIG. 1B-5, in accordance with one embodiment of the present invention. As also shown in Table 16, the eight assertion is located in section 1.2 of chapter 4.

TABLE 16

XML Representation of Assertion 8

```
</assertion>
    <id> Java Server Pages: 1.2__PDF1:4:4.1:1 </id>
    <name> JSP/default-response-object/HHpServlet Response </name>
    <description> The default request object is expected to extend
    HHpServlet
        Response </description>
</assertion>
```

Reference is made to a simplified block diagram of FIG. 2, illustrating a plurality of static XML files 210 and a plurality of assertion documents 200' interfacing with an assertion coverage tool 202, in accordance with one embodiment of the present invention. As will be described in greater detail, in one embodiment, the assertion coverage tool 202 is configured to correlate data in corresponding static XML file 210 of a test suite with data in one or more assertion documents 200' tested by the test suite. As shown, users 206 can query the assertion coverage tool 202 using an XSLT interface 204.

In one embodiment the corresponding static XML file 210 of a test suite is created manually by the test suite developer. In another embodiment, the static XML file 210 is generated automatically. In the latter situation, the test suite developer includes the assertions defined in the specification document or in the assertion document in the test suite code, while the test suite developer creates the test suite.

Figure 3A:
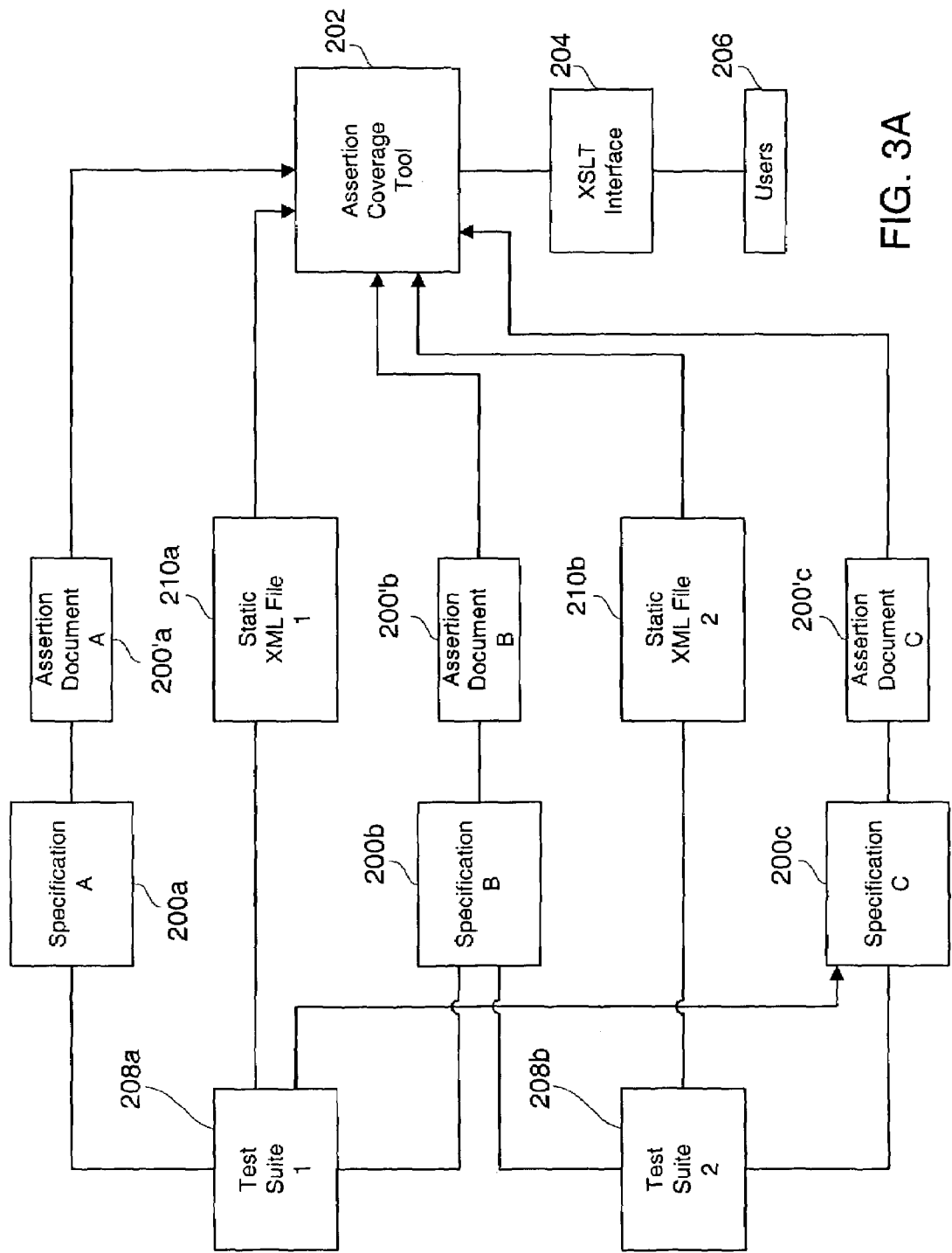
FIG. 3A is a simplified block diagram of an exemplary assertion coverage tool interfacing with a plurality of static XML files and a plurality of assertion documents, in accordance to yet another embodiment of the present invention.

Interfacing of a plurality of static XML files 210 and assertion documents 200' with the assertion coverage tool 202 can further be understood with respect to the simplified block diagram shown in FIG. 3A, in accordance with one embodiment of the present invention. As shown, the test suite 208a is designed to test specifications 200a, 200b, and 200c while the test suite 208b is designed to test specifications 200b and 200c. Respective static XML files 210a and 210b are shown to have been created for test suites 208a and 208b. In a like manner, assertion documents 200'a to 200'c corresponding to specifications 200a through 200c are shown to have been created.

In one embodiment, the assertion coverage tool 202 of the present invention can be used to determine the extent of coverage of each assertion in specifications 200a–200c by test suites 208a and 208b. For instance, as shown, test suite 208a is shown to be testing the specifications 200a–200c while the test suite 208b is shown to test only specifications 200b and 200c. Once the specifications configured to be tested by each test suite have been ascertained, the corresponding static XML file of the given test suite and the assertion documents corresponding to the specifications being tested are fed into the assertion coverage tool 202. For example, once it is determined that the test suite 208a is designed to test specifications 200a–200c, the corresponding assertion documents 200'a–200'c as well as the static XML file 210a associated with the test suite 208a are fed into the assertion coverage tool 202. In a like manner, once it has been determined that the test suite 208b covers the specifications 200b and 200c, the corresponding assertion documents 200'b and 200'c are fed into the assertion coverage tool 202 along with the static XML file 210 corresponding to the test suite 208b.

In this way, data associated with each and every assertion in each specification can be correlated with data in the applicable static XML file. Consequently, users 206 querying a particular data with respect to a specific assertion in a specification can obtain a desired information by interfacing with the assertion coverage tool 202 using the XSLT interface 204. Additional details with respect to correlation of data using the assertion coverage data 202 is provided below with respect to FIGS. 3B through 3F-2.

Figure 3B:
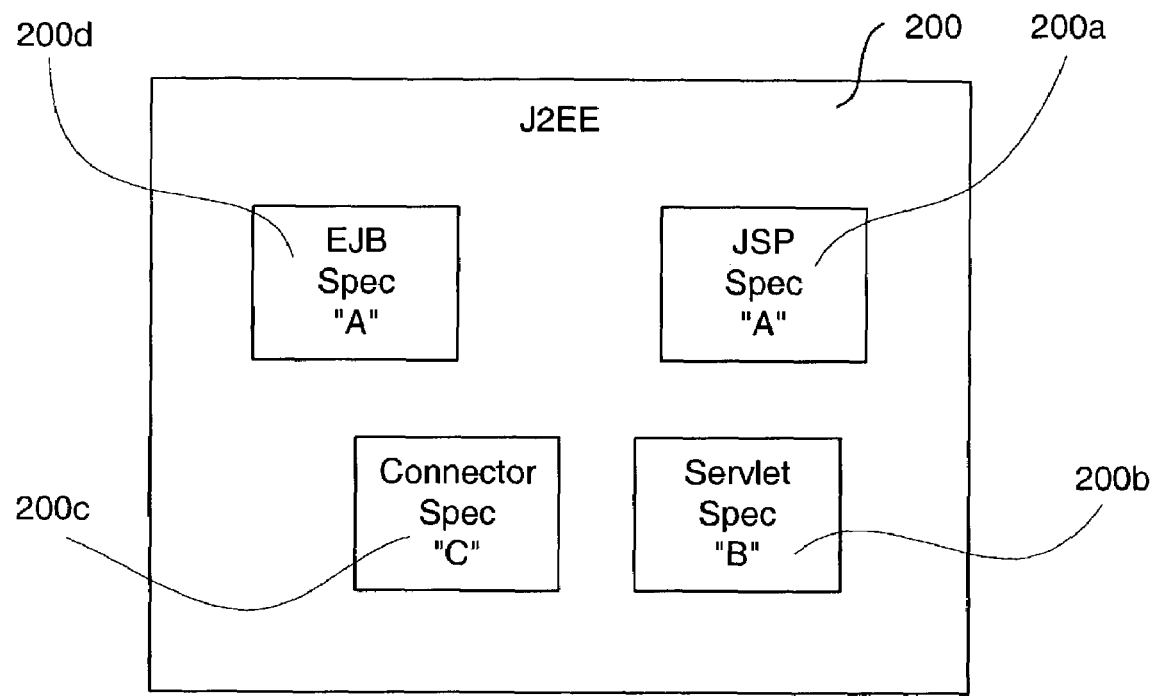
FIG. 3B is a block diagram depicting a plurality of specifications in a Java 2 Platform, Enterprise Edition (J2EE) application, in accordance to still another embodiment of the present invention.
Figure 3C:
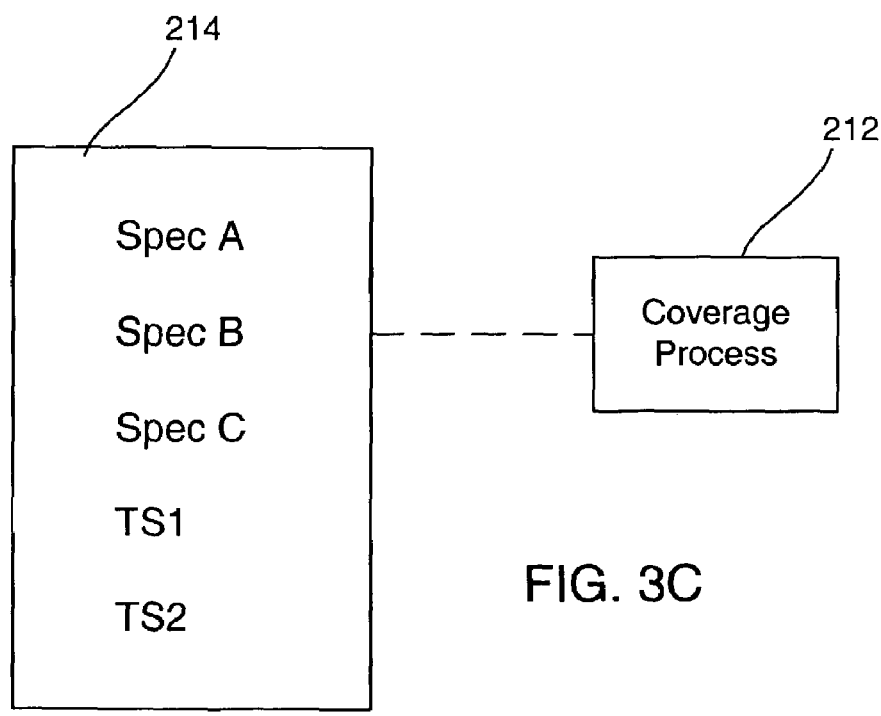
FIG. 3C is a simplified diagram depicting a coverage process as defined by a plurality of technologies (i.e., specifications) being tested by a plurality of test suites, in accordance to yet another embodiment of the present invention.

In accordance with one embodiment, the assertion coverage tool of the present invention can be implemented to determine test coverage of specifications implemented in a Java 2 Platform, Enterprise Edition (J2EE) application, as shown in FIG. 3B. As can be seen, in the embodiment of FIG. 3B, the J2EE application 200 includes a plurality of technologies, each corresponding to a different specification (e.g., Java Server Page (JSP) specification 200a, a servlet specification 200b, a connector specification 200c, and an EJB specification 200d, etc.). In this manner, a coverage process 212 shown in the embodiment of FIG. 3C may be implemented to determine the coverage of a plurality of technologies (i.e., specifications) by a plurality of test suites, as shown in 214, in accordance with one embodiment of the present invention.

Figures 1, 1B, 2, 3, 4:
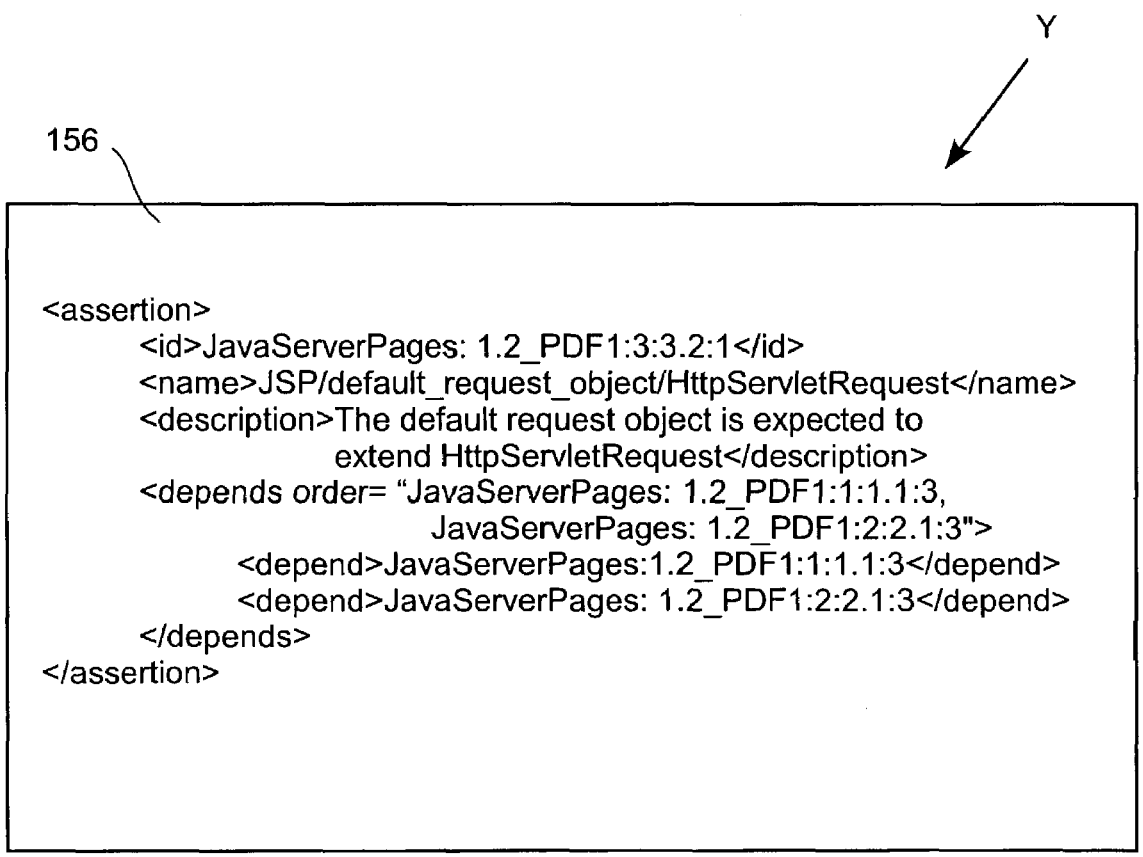
Figures 1, 3D:
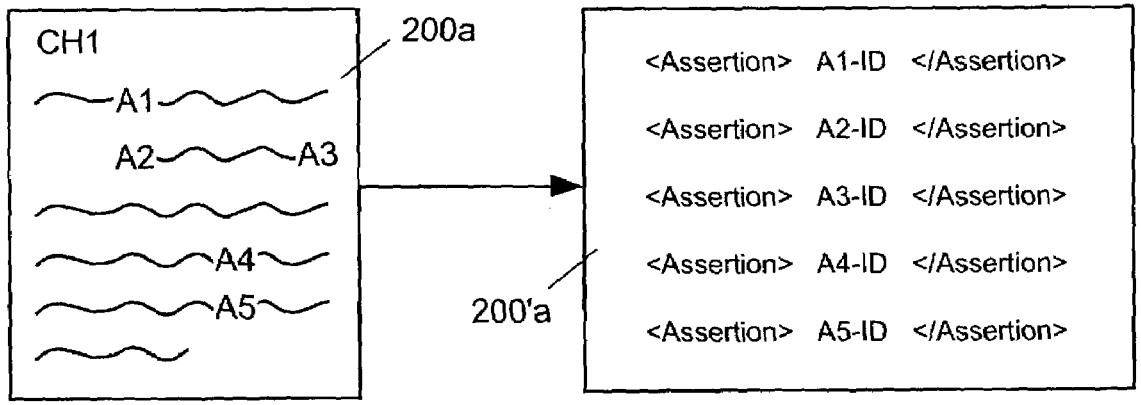
Figures 2, 3D:
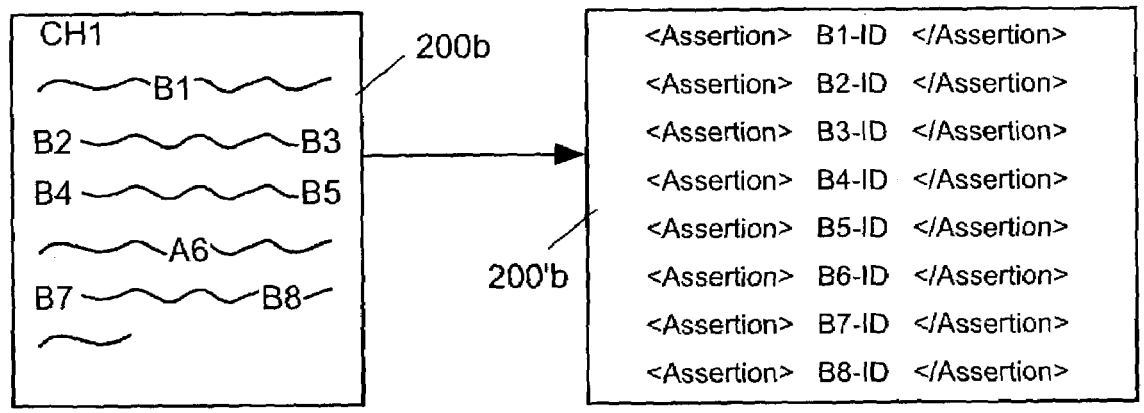
Figures 3, 3D:
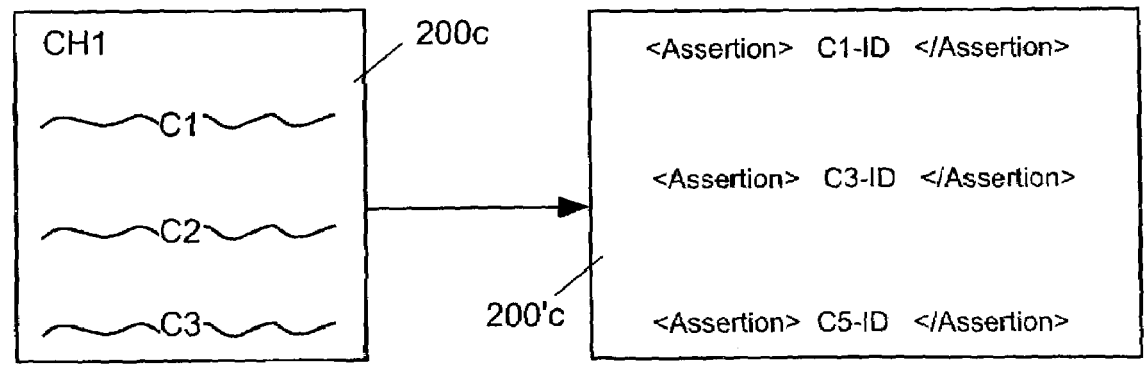

FIGS. 3D-1 through 3D-3 depict simplified assertion documents 200'a through 200'c associated with the specifications 200a through 200c, respectively, in accordance with one embodiment of the present invention. As shown, the specification 200a comprises of chapter one which in turn contains a plurality of assertions A1 through A5. The corresponding assertion document 200'a is shown to include the respective assertion identifications for each of the assertions A1 through A5.

In a like manner, the specification 200b is shown to include a plurality of assertions B1 through B8, as defined in chapter 1, while the analogous assertion document 200'b is shown to include the assertion identifications corresponding to each of the assertions B1 through B8. Likewise, the specification 200c is shown to include a plurality of assertions C1 through C3 defined in chapter 1. Assertion document 200'c is also shown to include the assertion identifications for the assertions C1 through C3.

It must be noted that the assertion documents 200'a through 200'c are constructed as described above in reference to FIGS. 1 through 1B-5. However, for ease of reference, merely the assertion identification for each assertion has been illustrated in the assertion documents in FIGS. 3D-1 to 3D-3. One having ordinary skill in the art must appreciate that although not depicted, the assertion documents 200'a through 200'c include all significant components described in FIGS. 1A through 1B-5, as described above.

Figures 1, 3E:
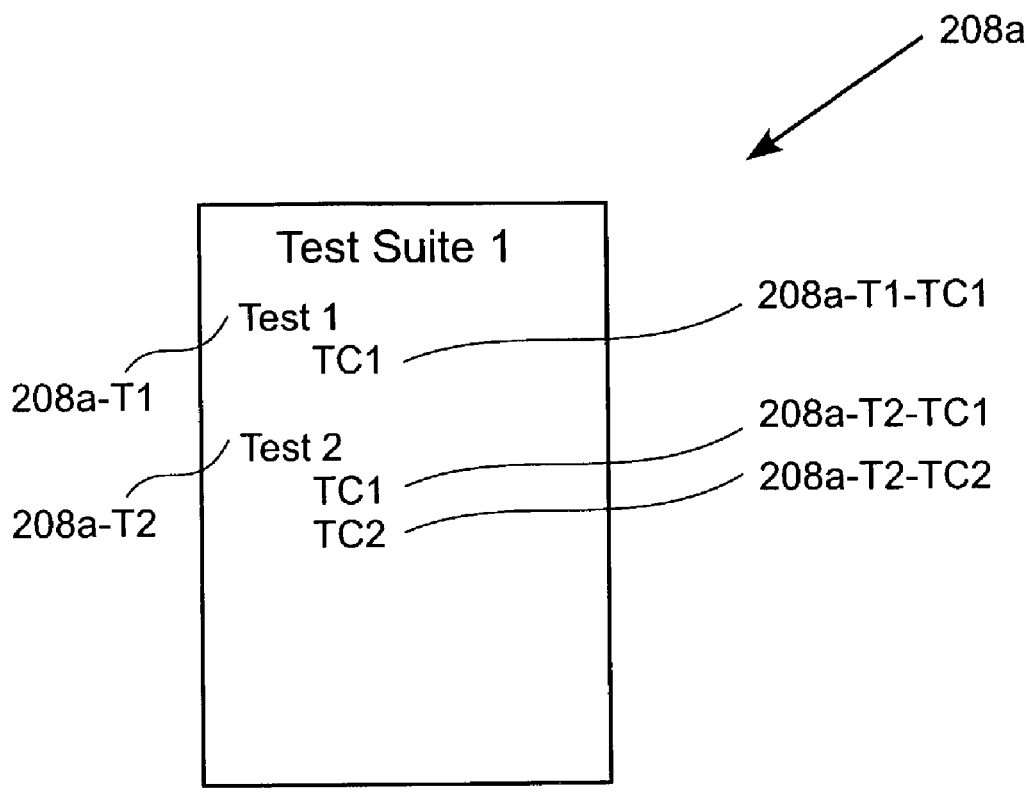
Figures 2, 3E:
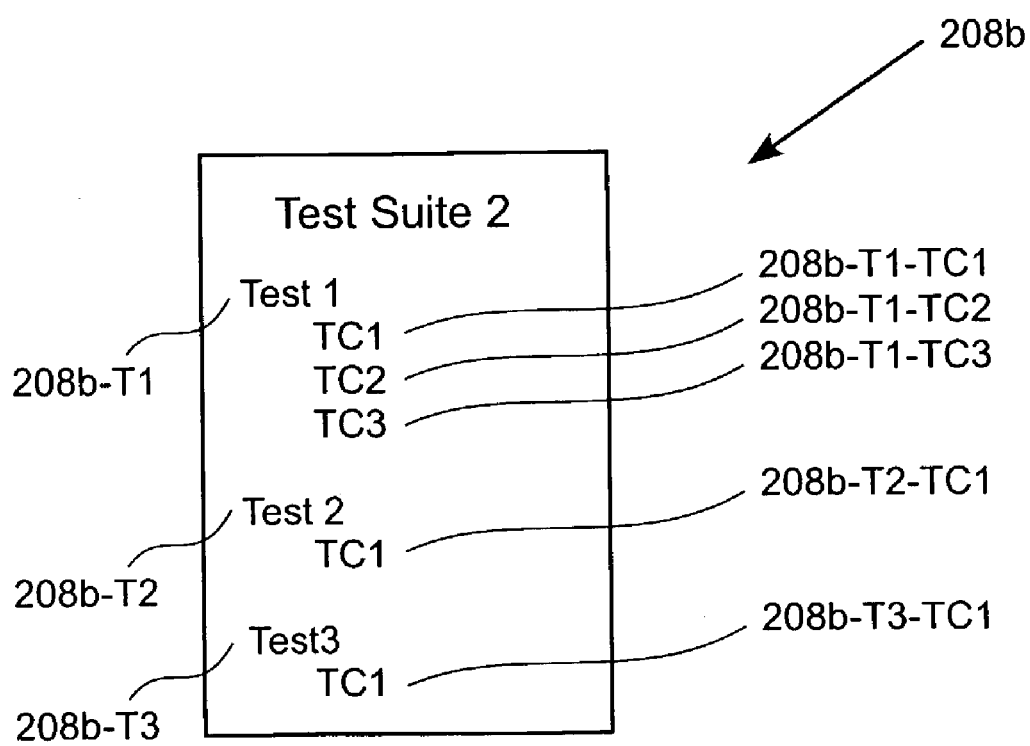

Continuing to FIGS. 3E-1 and 3E-2, a test suite structure can further be understood, in accordance with one embodiment of the present invention. As can be seen in FIG. 3E-1, the test suite 208a includes tests 208a-t1 and 208a-t2 respectively designed to include test case 208a-t1-tc1 and 208a-t2-tc1 and 208a-t2-tc2. In a like manner, the test suite 208b is shown to include tests 208b-t1, 208b-t2, and 208b- t3. As illustrated, the test 208b-t1 includes test cases 208b-t1-tc1 through 208b-t1-tc3, the test 208b-t2 includes test case 208b-t2-tc1, and the test 208b-t3 includes the test case 208b-t3-tc1.

Figures 1, 3F:
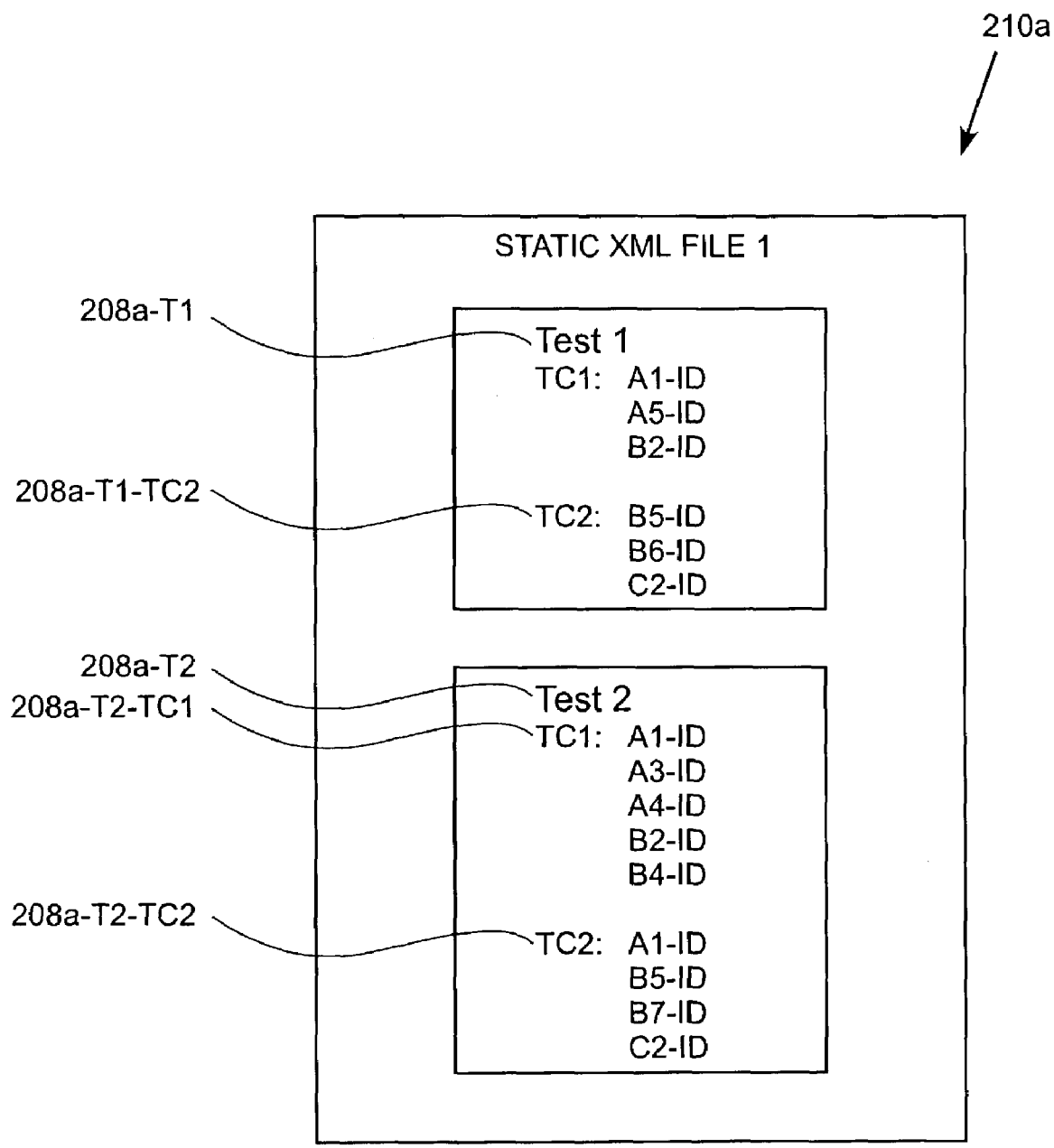
Figures 2, 3F:
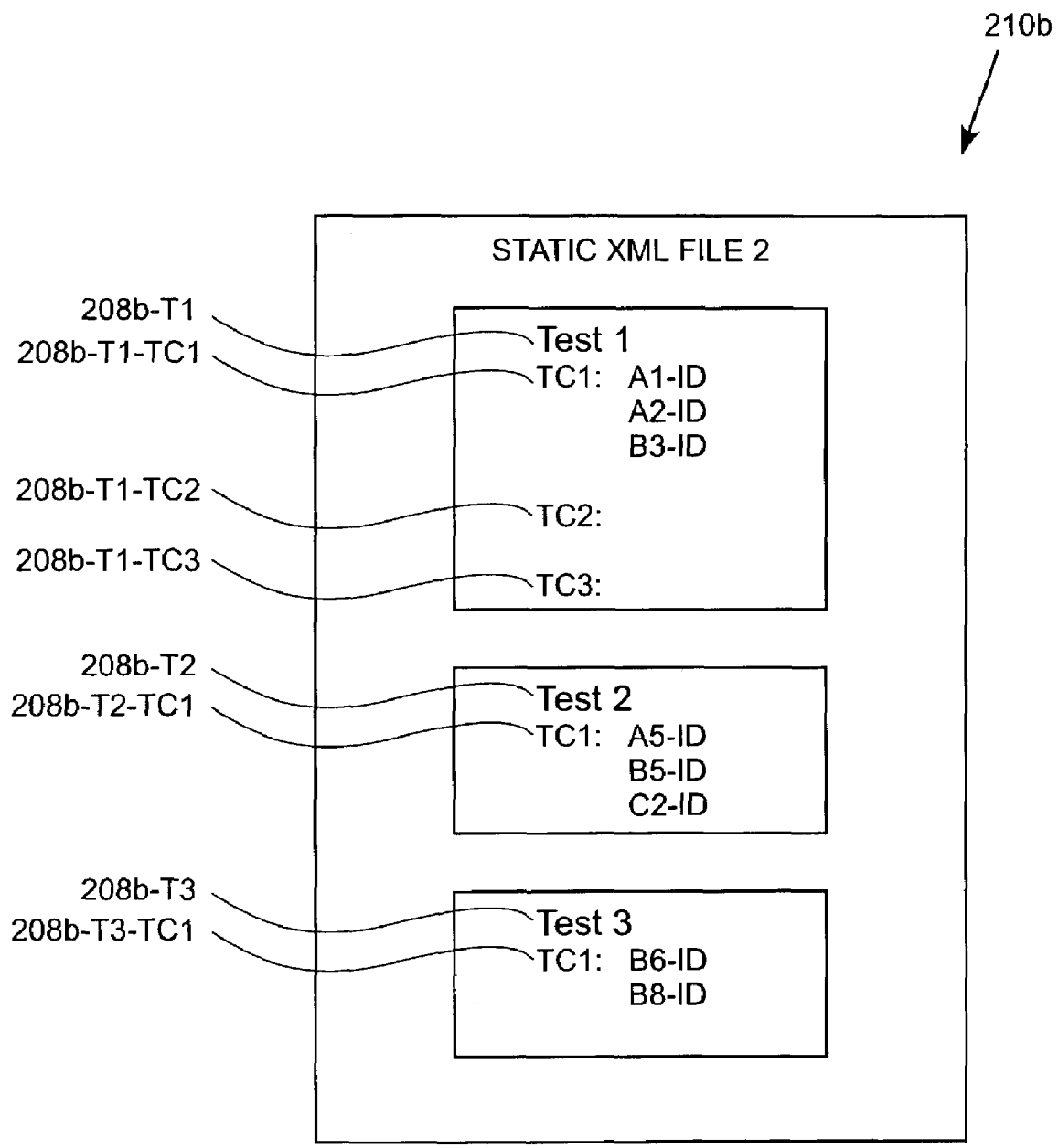

Reference is made to FIG. 3F-1 depicting the static XML file 210a corresponding to the test suite 208a, in accordance with one embodiment of the present invention. The static XML file 210a is shown to include a list of all assertions tested by each test case of each test in the test suite 208a. As can be seen, the test case 208a-t1-tc1 of the test 208a-ti is shown to test assertions A1 and A5 of the specification 200a and the assertion B2 of the specification 200b. In a like manner, the test case 208a-t1-tc2 of the test 208a-t1 is shown to test assertions B5 and B6 of the specification 200b and the assertion C2 of the specification 200c.

Likewise, test case 208a-t2-tc1 of the test 208a-t2 is shown to test assertions A1, A3, and A4 of the specification 200a and assertions B2 and B4 of the specification 200b. The test 208a-t2-tc2 is shown to be testing the assertion A1 of the specification 200a, assertions B5 and B7 of the specification 200b, and the assertion C2 of the specification 200c.

FIG. 3F-2 depicts the static XML file 210b corresponding to the test suite 208b, in accordance with one embodiment of the present invention. The static XML file 210b also includes a list of all assertions tested by each test case of each test in the test suite 208b. As shown, the test case 208b-t1-tc1 of the test 208b-t1 is shown to test assertions A1, A2, and A3 of the specification 200a. Comparatively, test cases 208b-t1-tc2 and 208b-t1-tc3 of the test 208b-t1 do not cover any of the assertions in any of the specifications 200a through 200c. In a like manner, the test case 208b-t1-tc2 of the test 208b-t2 is shown to test the assertion A5 of the specification 200a, the assertion B5 of the specification 200b, and the assertion C2 of the specification 200c. Likewise, test case 208b-t3-tc1 of the test 208b-t3 is shown to test assertions B6 and B8 of the specification 200b.

In accordance with one implementation, the assertion coverage tool 202 correlates data associated with the coverage process 212, creating an exemplary XML coverage file 300, as depicted in FIG. 3G. For instance, data provided by the static XML files 210a and 210b and assertion documents 200a through 210c can be correlated in accordance with an inquiry submitted by a user. The XML coverage file 300 can provide a user with each of the assertions tested by each of the test suites 208a and 208b, as shown in 350 and 352. Additionally, if requested, the XML coverage file 300 can provide the user with a list of the assertions that have not been tested by any of the test suites 208a and 208b, as shown in 354 and 356.

By way of example, a user can query the assertion coverage tool so as to determine whether any of the assertions in any of the assertion documents has not been tested, as shown in 358. Alternatively, the user can query the assertion coverage tool so as to determine whether any of the assertions has been tested by more than one test suite, as shown in 360. Thus, the embodiments of the present invention enable a test developer to determine whether each and every assertion has been tested, the extent of the test coverage of each assertion, whether any of the tested assertions are in different test suites, and whether the test suites fail to test a specific assertion.

Figure 4A:
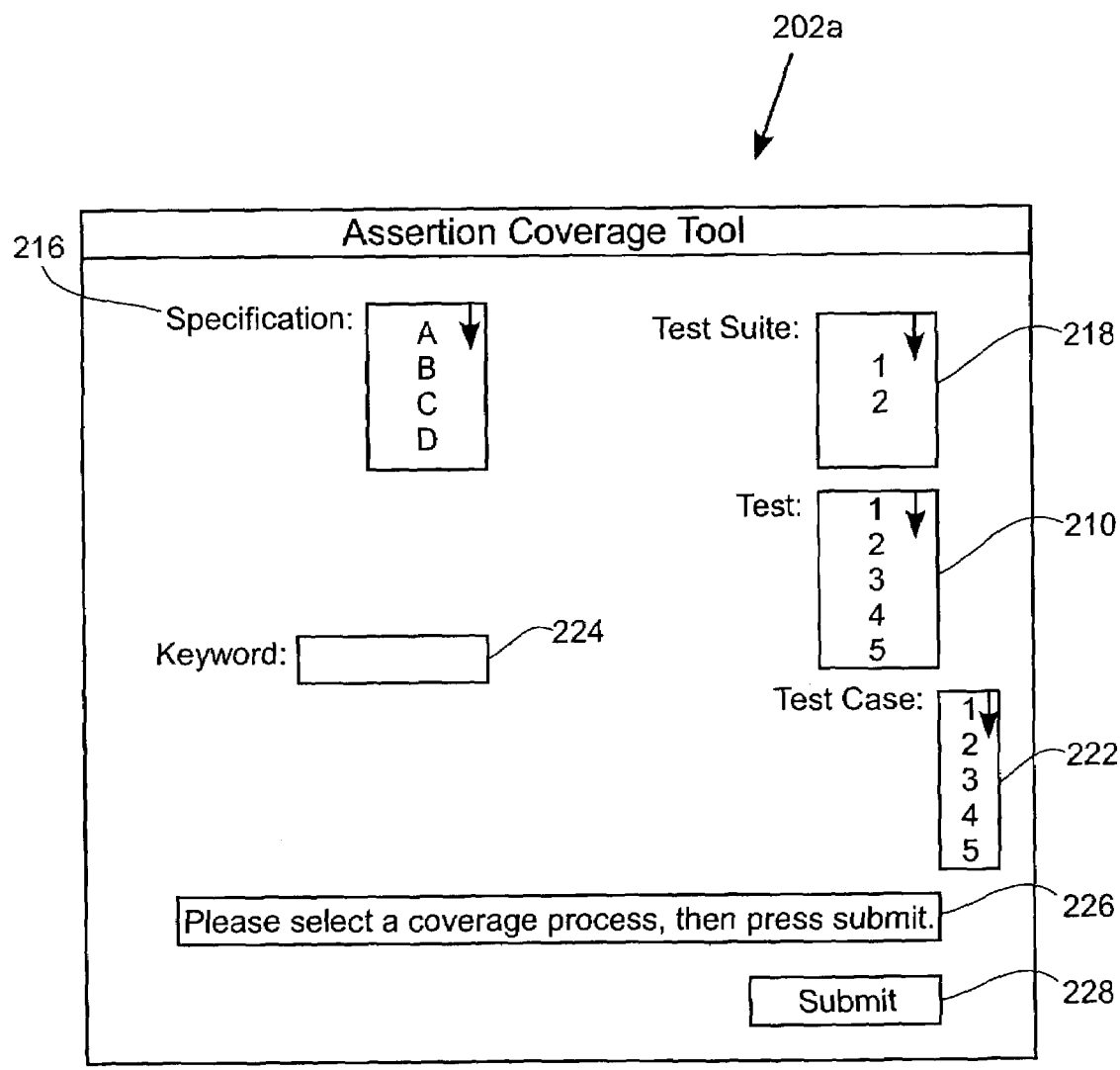
FIG. 4A depicts a graphical user interface (GUI) of an assertion coverage tool utility implemented to interface with the assertion documents and static XML files, in accordance to still another embodiment of the present invention.

FIG. 4A depicts a graphical user interface (GUI) 202a of an assertion coverage tool utility, in accordance with one embodiment of the present invention. The GUI 202a includes a specification pull down option 216, which in this embodiment, is shown to include the specifications A, B, C, and D. The GUI 202a further includes the test suite pull down option 218, which as can be seen, includes a test pull down option 220, and a test case pull down option 222. In one instance, the user may query the assertion tool coverage by merely choosing a test suite 218, or the user may be given an option to further restrict the user's selection, by further selecting a specific test 220 or test case 222.

Figure 4B:
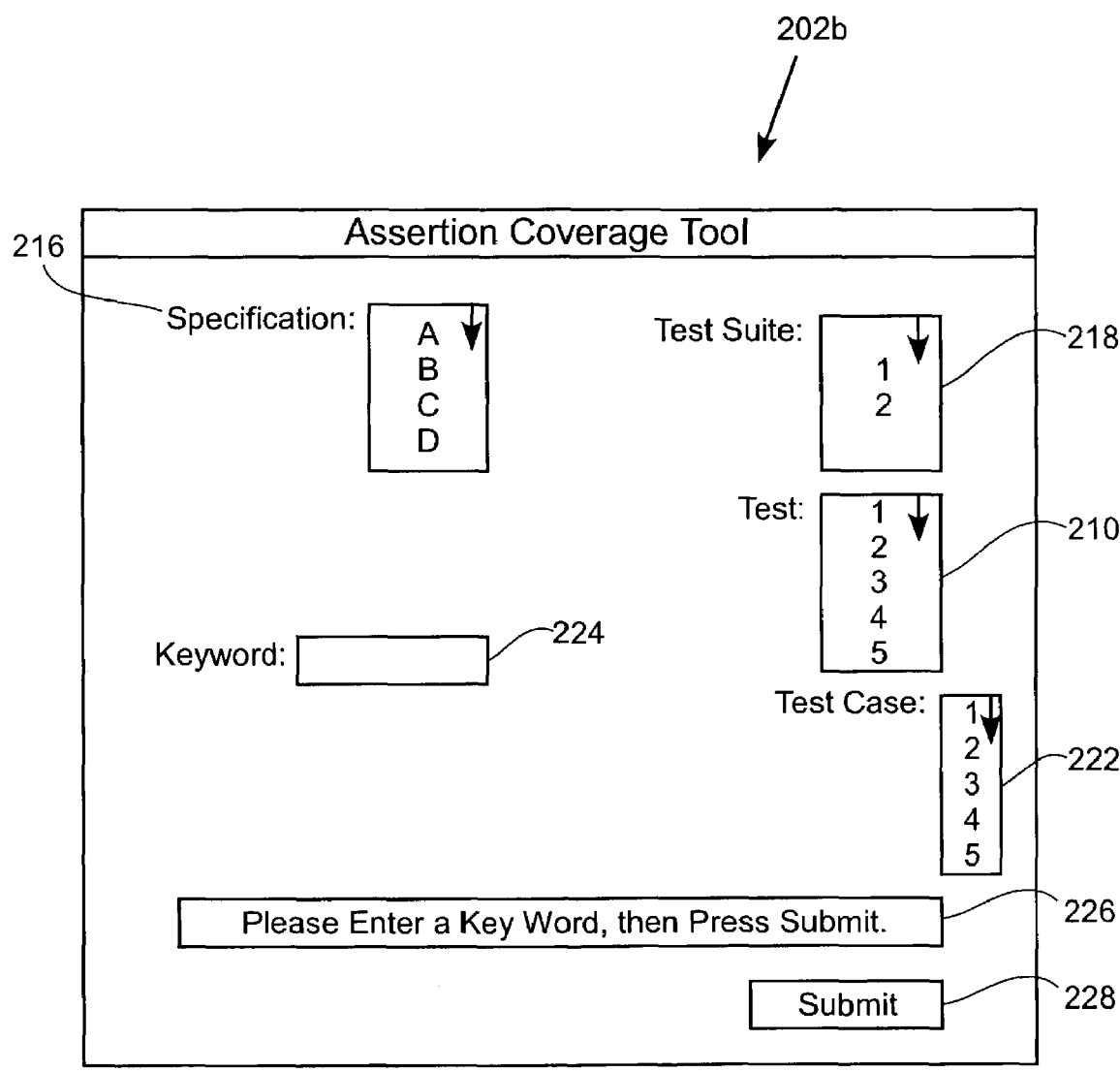
FIG. 4B depicts a graphical user interface (GUI) of an assertion coverage tool utility implemented to interface with assertion documents and static XML files, in accordance to yet another embodiment of the present invention.
Figure 5:
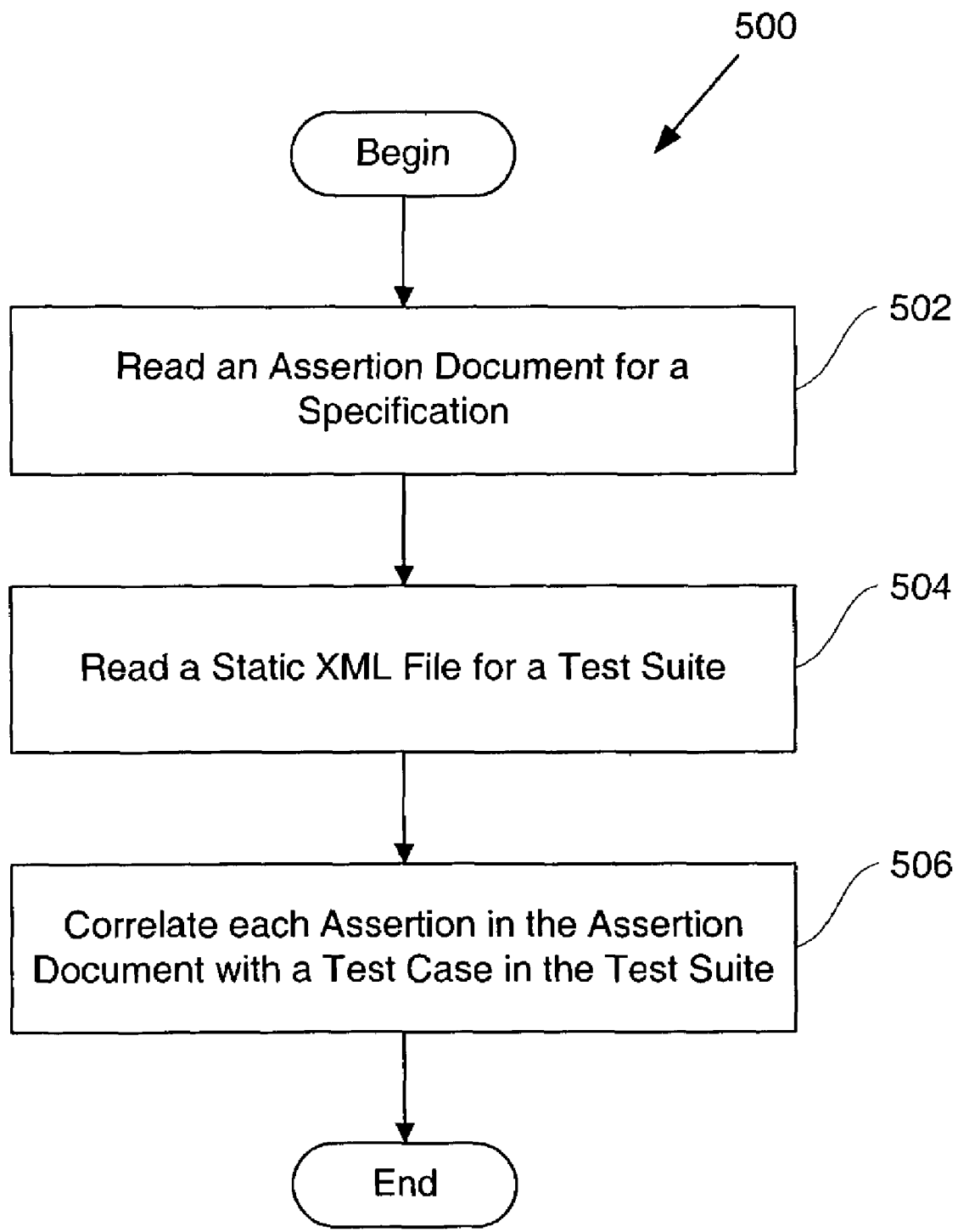

By way of example, the user may be given an option to select a coverage process as shown in 226 by pressing a submit button 228. According to another embodiment, the user may choose to query the assertion tool coverage using a keyword 224, as shown in a GUI 202b of FIG. 4B. Once the keyword has been entered in 226, the user is configured to press the submit button 228.

Figures 1, 1B, 2, 3, 4, 5:
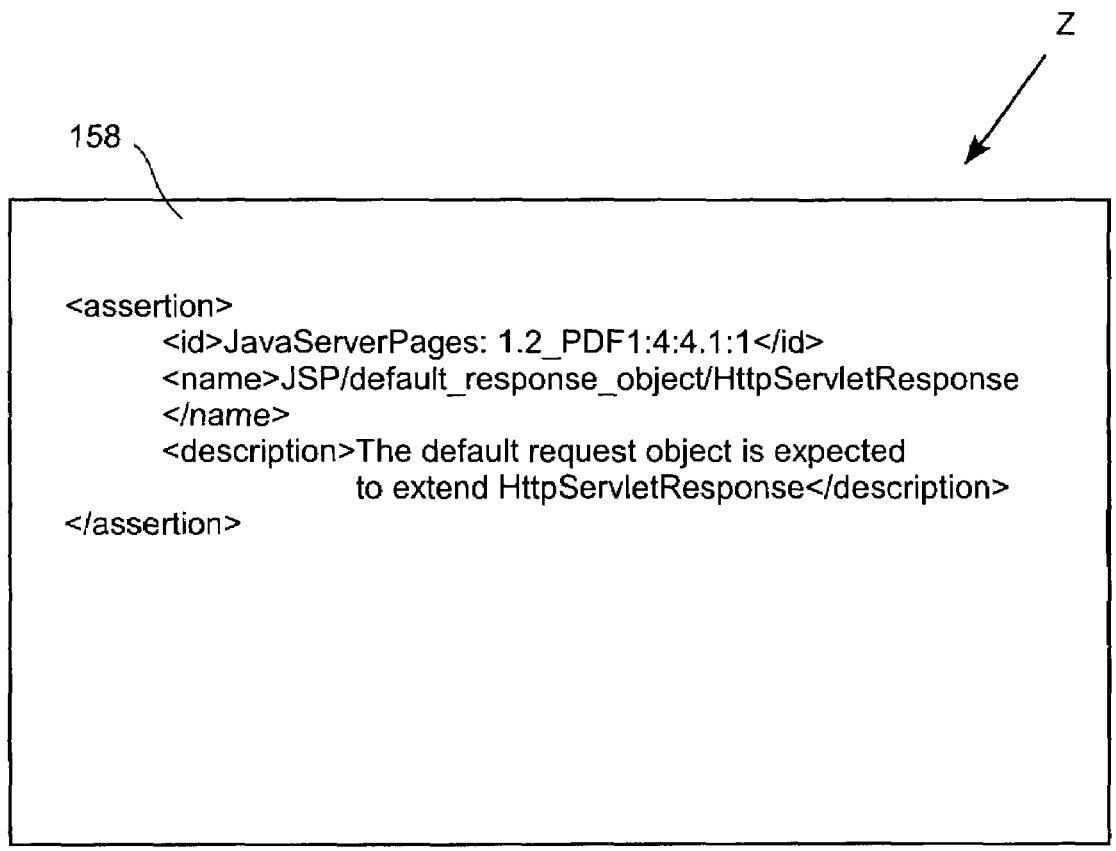

FIG. 5 is a flow chart diagram 500 of method operations performed by an exemplary assertion coverage tool, in accordance with one embodiment of the present invention. The method begins with operation 502 in which an assertion document for a specification is read. Thereafter, a static XML file for a test suite is read in operation 504. Next, in operation 506, each assertion in the assertion document is correlated with a test case in the test suite. In this manner, a developer can obtain information with respect to extent of coverage of an assertion or a specification by a test suite.

Figure 6:
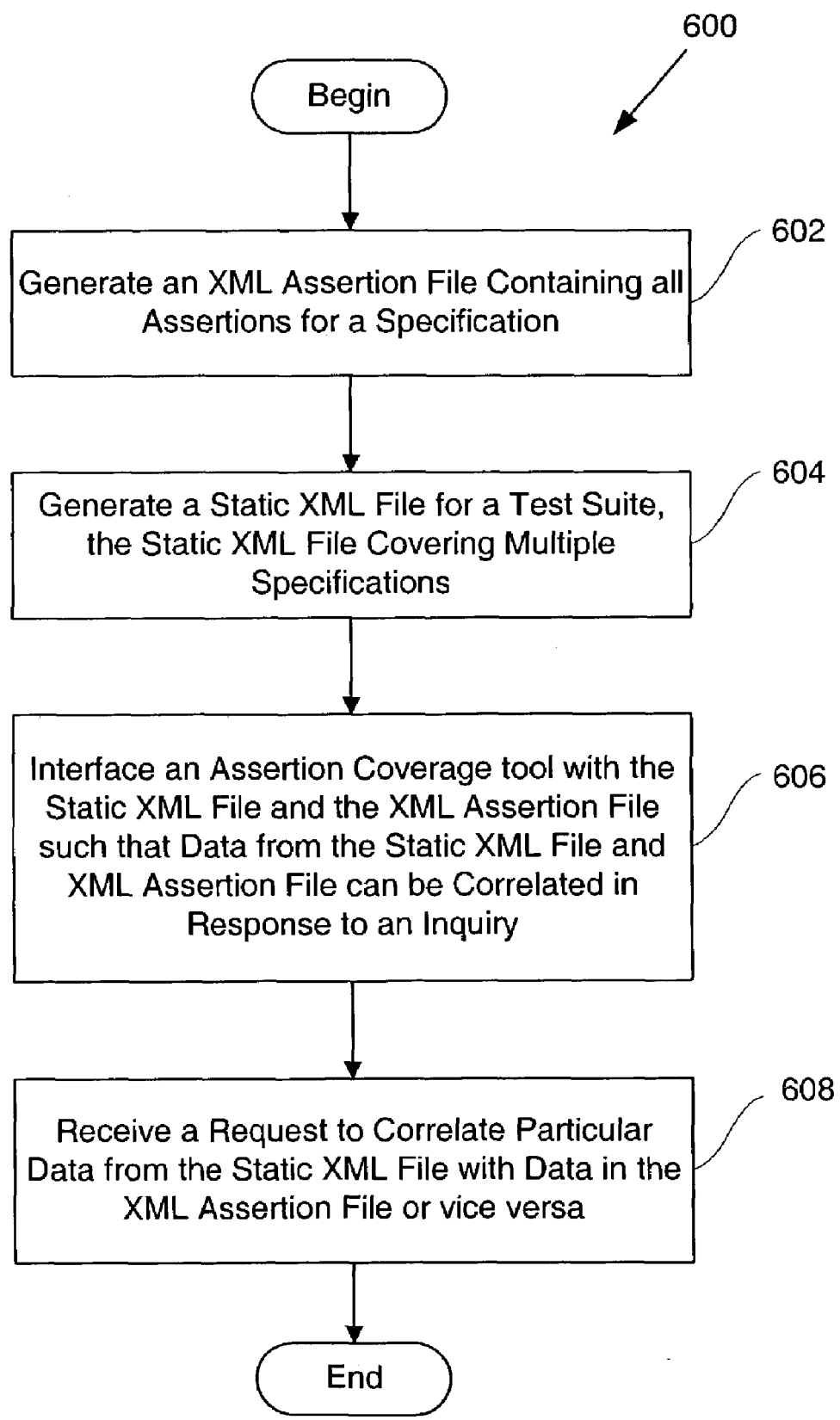
FIG. 6 is a flow chart diagram of method operations performed an exemplary assertion coverage tool, in accordance with yet another embodiment of the present invention.

FIG. 6 is a flow chart diagram 600 of method operations performed by an exemplary assertion coverage tool, in accordance with one embodiment of the present invention. The method begins in operation 602 in which an XML assertion file containing each of the assertions in a specification is created. Next, in operation 604, a static XML file for a test suite is created. In one example, the static XML file can be configured to cover a multiplicity of specifications. However, in a different embodiment, the static XML file may be configured to cover one specification.

Continuing to operation 606, the assertion coverage tool is interfaced with the static XML file and the XML assertion file. In this manner, data from the static XML file and the XML assertion file can be correlated in response to an inquiry by a user. Then, in operation 608 a request to correlate particular data from the static XML file with data in the XML assertion file or vice versa, is received.

The advantages of the present invention are numerous. Most notably, the embodiments of the present invention allow assertions in a specification document to be correlated with data in a static XML file. In this manner, a user can query the assertion coverage tool of the present invention so as to determine whether a specific assertion in the specification document has been tested, or whether a specific assertion has been tested in excess by a plurality of test cases. Another advantage of the assertion coverage tool of the present invention is that it enables a user to determine whether any assertion in a given specification has not been tested, thus allowing the test developers to create specific test cases covering that specific assertion. Still another advantage of the embodiments of the present invention is its capability to locate and display test cases as well as assertions containing a specific keyword. Yet another advantage is that the embodiments of the present invention provide an open methodology that enables individuals to create an application for the individual to browse the results generated by the tool.

With the above embodiments in mind, it should be understood that although the present invention mainly describes exemplary embodiments of implementing XML representation of software specification documents, it must be understood by one having ordinary skill in the art that the XML representation of the present invention can be implemented to represent any document (e.g., specifications, implementation requirements, implementation design, etc.). Furthermore, although in the present invention the XML has been implemented for representing the assertions in the specification document, in a different embodiment, any suitable language capable of tagging the software documents can be implemented. Furthermore, although the embodiments of the present invention implement XSLT Stylesheet to display the assertion document, in a different embodiment, any suitable language to display the assertion document in any format desired.

Additionally, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter, be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Furthermore, although the present invention implements Java programming language, other programming languages may be used to implement the embodiments of the present invention (e.g., C, C++, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for analyzing a test coverage of a software application specification by a test suite, the method comprising:
    reading an assertion document for a specification, the assertion document having a corresponding tagged assertion for each assertion in the specification, each tagged assertion being defined in a markup language;
    reading a static file for defining tests of the test suite, the static file being defined in the markup language, the test suite being divided into tests, each test being divided into test cases, the static file configured to include an entry for each test case, and each entry configured to include tagged assertions tested by the test case; and
    correlating each of the tagged assertions in the assertion document with the test cases in the static file so as to determine test coverage of the specification.

2. A method as recited in claim 1, wherein the static file is defined in an extensible markup language (XML).

3. A method as recited in claim 1, wherein each tagged assertion in the assertion document is marked in XML.

4. A method as recited in claim 1, wherein correlating each of the tagged assertions in the assertion document with the test cases in the static file so as to determine the test coverage of the specification includes,
    determining the test coverage of a particular tagged assertion in the assertion document.

5. A method as recited in claim 1, wherein correlating each of the tagged assertions in the assertion document with the test cases in the static file so as to determine the test coverage of the specification includes,
    locating test cases covering each of the tagged assertions containing a particular keyword.

6. A method as recited in claim 1, wherein the software application specification is an enterprise application.

7. A method for analyzing a test coverage of a plurality of software application specifications by a plurality of test suites, the method comprising:
    reading assertion documents for each specification, each assertion document having a corresponding tagged assertion for each assertion in the respective specification, each tagged assertion being defined in a markup language;
    reading a static file defining tests of each test suite, each static file being defined in the markup language, each test suite being divided into tests, each test being divided into test cases, each static file configured to include an entry for each respective test case, and each entry configured to include tagged assertions tested by the test case; and
    correlating each of the tagged assertions in each assertion document with test cases in the corresponding static file so as to determine test coverage of each specification by each test suite.

8. A method as recited in claim 7, wherein the specification is tested by a plurality of test suites.

9. A method as recited in claim 7, further comprising, receiving a user query for the test coverage of a specific tagged assertion by a particular test suite; and
    correlating data in the assertion documents with data in the static files so as to determine the test coverage of the specific tagged assertion by the particular test suite.

10. A method as recited in claim 7, further comprising receiving a user query for the test coverage of tagged assertions including a given keyword by test suites; and
    correlating tagged assertions including the given keyword in assertion documents with test suites so as to determine the test coverage of tagged assertions including the given keyword by test suites.

11. A method as recited in claim 7, wherein the markup language of each static file is an extensible markup language (XML).

12. A method as recited in claim 7, wherein the markup language used to mark each tagged assertion in assertion documents is XML.

13. A method as recited in claim 7, wherein software applications are enterprise applications.

14. A computer program embodied on a computer readable medium for analyzing a test coverage of a software application specification, the computer program comprising:

program instructions for interfacing with an assertion file containing a plurality of assertions defined in the specification, the plurality of assertions in the assertion file tagged in a markup language;

the assertion file having a corresponding tagged assertion for each assertion in the specification;

program instructions for interfacing with a static file for a test suite, the test suite configured to test the specification;

the static file being defined in a markup language, the test suite being divided into tests, each test being divided into test cases, the static file configured to include an entry for each test case, each entry of the static file configured to include tagged assertions tested by the test case;

program instructions for correlating data in each of the tagged assertions from the assertion file with data in the static file so as to provide a response to a request for a particular data; and program instructions for receiving the request for the particular data so as to determine test coverage of the specification.

15. A computer program as recited in claim 14, wherein the markup language is an extensible markup language (XML).

16. A computer program as recited in claim 14, wherein the static file is defined using a markup language.

17. A computer program as recited in claim 16, wherein the markup language is XML.

18. A computer program as recited in claim 14, further including, program instructions for tagging assertions in the software application specification.

19. A computer program as recited in claim 14, further including, program instructions for receiving a query from a user, the query including a keyword;

program instructions for locating tagged assertions in the assertion file including the keyword; and program instructions for correlating tagged assertions in the assertion file including the keyword with test cases in the static file.

* * * * *